(12) United States Patent
Jo et al.

(10) Patent No.: US 9,897,486 B2
(45) Date of Patent: Feb. 20, 2018

(54) METHOD OF CALIBRATING AND USING A MEASURING APPARATUS THAT PERFORMS MEASUREMENTS USING A SPECTRUM OF LIGHT

(71) Applicant: SAMSUNG ELECTRONICS CO., LTD., Suwon-si, Gyeonggi-Do (KR)

(72) Inventors: Tae-Yong Jo, Hwaseong-si (KR); Young-Joo Lee, Hwaseong-si (KR); Chang-Hoon Choi, Hwaseong-si (KR); Jong-Jeong Kim, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/402,751

(22) Filed: Jan. 10, 2017

(65) Prior Publication Data

US 2017/0328771 A1 Nov. 16, 2017

(30) Foreign Application Priority Data

May 16, 2016 (KR) .................. 10-2016-0059789

(51) Int. Cl.
  *G01D 18/00* (2006.01)
  *G01J 3/02* (2006.01)
(52) U.S. Cl.
  CPC .................. *G01J 3/0297* (2013.01)
(58) Field of Classification Search
  CPC .................................................. G01B 21/045
  See application file for complete search history.

(56) References Cited

U.S. PATENT DOCUMENTS

| | | |
|---|---|---|
| 7,002,693 B2 | 2/2006 | Shinya |
| 7,280,210 B2 | 10/2007 | Nabatova-Gabain et al. |
| 7,283,240 B2 | 10/2007 | Mestha et al. |
| 7,411,665 B2 | 8/2008 | Iffland |
| 7,567,351 B2 | 7/2009 | Opsal et al. |
| 7,933,026 B2 | 4/2011 | Opsal et al. |
| 7,973,930 B2 | 7/2011 | Tanaka |
| 8,049,903 B2 | 11/2011 | Opsal et al. |
| 8,547,538 B2 | 10/2013 | David |
| 2006/0238759 A1 | 10/2006 | Okabe et al. |
| 2009/0157343 A1* | 6/2009 | Kaushal ............... G01B 21/045 702/97 |
| 2011/0080586 A1 | 4/2011 | Okabe et al. |

(Continued)

FOREIGN PATENT DOCUMENTS

| | | |
|---|---|---|
| EP | 2 111 529 | 8/2015 |
| JP | 3422294 | 4/2003 |

(Continued)

*Primary Examiner* — Kiho Kim
(74) *Attorney, Agent, or Firm* — F. Chau & Associates, LLC

(57) ABSTRACT

A method of calibrating a measuring apparatus includes determining apparatus parameters that have an influence on a measurement spectrum generated by the measuring apparatus, generating the measurement spectrum by exposing a measurement target on a sample to light generated by the measuring apparatus, calculating an error of the apparatus parameters by comparing the measurement spectrum to an ideal spectrum corresponding to the apparatus parameters, and calibrating the measuring apparatus based on the calculated error of the apparatus parameters.

20 Claims, 37 Drawing Sheets

(56) References Cited

U.S. PATENT DOCUMENTS

| | | |
|---|---|---|
| 2013/0010296 A1 | 1/2013 | Kwak et al. |
| 2013/0132021 A1 | 5/2013 | Kwak et al. |
| 2014/0340682 A1 | 11/2014 | Kwak et al. |

FOREIGN PATENT DOCUMENTS

| | | |
|---|---|---|
| JP | 2006-201162 | 8/2006 |
| JP | 2007-057529 | 3/2007 |
| JP | 2010-223822 | 10/2010 |
| JP | 2013-160772 | 8/2013 |
| JP | 5461020 | 1/2014 |
| KR | 10-0765709 | 10/2007 |
| KR | 10-0773022 | 10/2007 |
| KR | 10-0779128 | 11/2007 |
| KR | 10-0961138 | 5/2010 |
| KR | 1020110101726 | 9/2011 |
| KR | 1020130084718 | 7/2013 |
| KR | 1020140025487 | 3/2014 |
| KR | 1020140056261 | 5/2014 |
| KR | 10-1486699 | 1/2015 |

\* cited by examiner

FIG. 13B
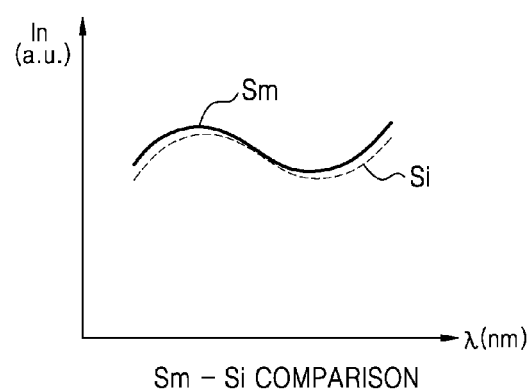
Sm − Si COMPARISON
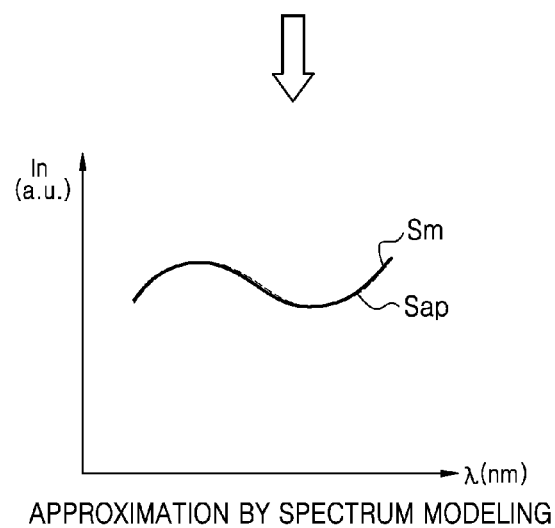
APPROXIMATION BY SPECTRUM MODELING

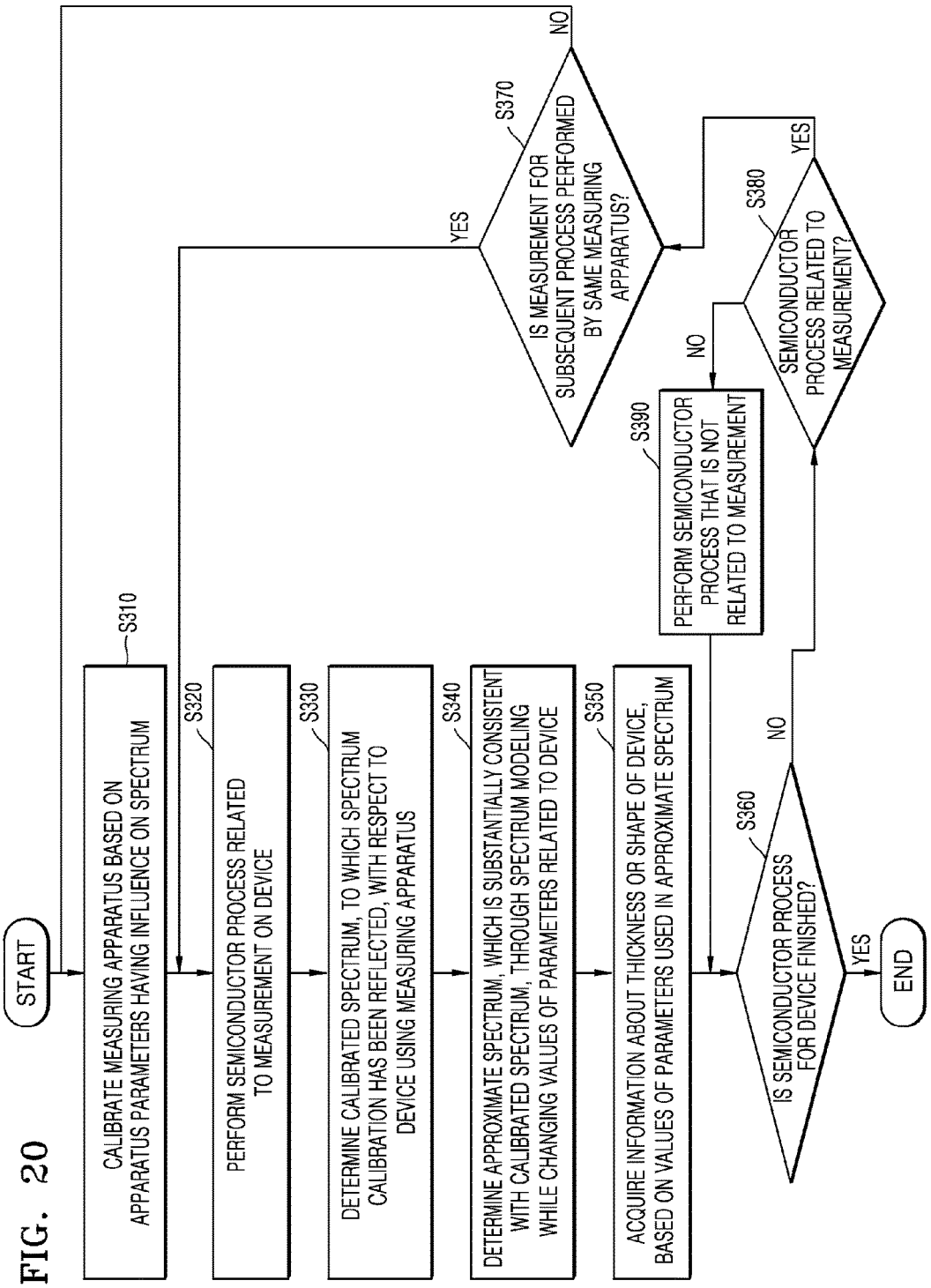

METHOD OF CALIBRATING AND USING A MEASURING APPARATUS THAT PERFORMS MEASUREMENTS USING A SPECTRUM OF LIGHT

CROSS-REFERENCE TO RELATED APPLICATIONS

This application claims priority under 35 U.S.C. § 119 to Korean Patent Application No. 10-2016-0059789, filed on May 16, 2016, the disclosure of which is incorporated by reference herein in its entirety.

TECHNICAL FIELD

Exemplary embodiments of the inventive concept to a method of calibrating and using a measuring apparatus that performs measurements using a spectrum of light.

DISCUSSION OF THE RELATED ART

Ellipsometry is an optical technique that is used to study dielectric characteristics of wafers. Ellipsometry may calculate information about a sample through an analysis of a change in polarized light that is reflected from the sample. The sample may be, for example, a wafer surface.

When light is reflected from the sample, a polarized state of the reflected light is changed due to physical properties of the material and the thickness of a layer of the sample. Ellipsometry may obtain information about the sample by measuring such a change, and may use this information to acquire a complex refractive index or dielectric function tensor of the material. As a result, information such as, for example, the form, crystallization state, chemical structure, and electrical conductivity of the material may be determined.

Ellipsometry may be used to measure a single layer or multilayer thin film in a range of several angstroms or tens of nanometers to several micrometers, and may be used in various fields of nanoscience, since the accuracy of ellipsometry is high. Spectroscopic ellipsometry (SE) is ellipsometry using a broadband light source, and may cover a specific spectrum range such as, for example, an infrared, visible, or ultraviolet light spectrum range. By covering a specific spectrum range, a complex refractive index or dielectric function tensor in the spectrum range may be acquired, and thus, various basic physical characteristics may be determined.

SUMMARY

Exemplary embodiments of the inventive concept provide a method of calibrating a measuring apparatus, which may reduce an error between processes and/or between measuring apparatuses, and a method of reliably measuring a device, based on the calibration method.

According to an exemplary embodiment of the inventive concept, a method of calibrating a measuring apparatus includes determining apparatus parameters that have an influence on a measurement spectrum generated by the measuring apparatus, generating the measurement spectrum by exposing a measurement target on a sample to light generated by the measuring apparatus, calculating an error of the apparatus parameters by comparing the measurement spectrum to an ideal spectrum corresponding to the apparatus parameters, and calibrating the measuring apparatus based on the calculated error of the apparatus parameters.

According to an exemplary embodiment of the inventive concept, a method of measuring a characteristic of a device includes calibrating a measuring apparatus based on apparatus parameters that have an influence on a first measurement spectrum generated by the measuring apparatus, wherein the first measurement spectrum is generated by exposing a measurement target on the device to light generated by the measuring apparatus, determining a calibrated spectrum with respect to the device using the calibrated measuring apparatus, determining a first approximate spectrum by changing values of parameters related to the device during a spectrum modeling process, wherein the first approximate spectrum is substantially consistent with the calibrated spectrum, and acquiring information about the characteristic of the device based on the values of the parameters related to the device used to obtain the first approximate spectrum.

According to an exemplary embodiment of the inventive concept, a method of manufacturing a device includes calibrating a measuring apparatus based on apparatus parameters that have an influence on a first measurement spectrum generated by the measuring apparatus, wherein the first measurement spectrum is generated by exposing a measurement target on the device to light generated by the measuring apparatus, performing a semiconductor process related to a measurement on the device, determining a calibrated spectrum with respect to the device using the calibrated measuring apparatus, determining a first approximate spectrum by changing values of parameters related to the device during a spectrum modeling process, wherein the first approximate spectrum is substantially consistent with the calibrated spectrum, and acquiring information about a characteristic of the device based on the values of the parameters related to the device used to obtain the first approximate spectrum.

In addition, a method of measuring a device and a method of manufacturing a device, based on the method of calibration, may reduce defects of products based on the reliability improvement in device measurement, thereby increasing the yield of products.

BRIEF DESCRIPTION OF THE DRAWINGS

The above and other features of the inventive concept will become more apparent by describing in detail exemplary embodiments thereof with reference to the accompanying drawings, in which:

FIGS. 13A to 13D are graphs showing a process of determining a calibrated spectrum by applying the calibration method of FIG. 1 to a plurality of measuring apparatuses.

FIG. 20 is a flowchart of a method of manufacturing a device based on a calibration method according to an exemplary embodiment of the inventive concept.

DETAILED DESCRIPTION OF THE EXEMPLARY EMBODIMENTS

Figure 1:
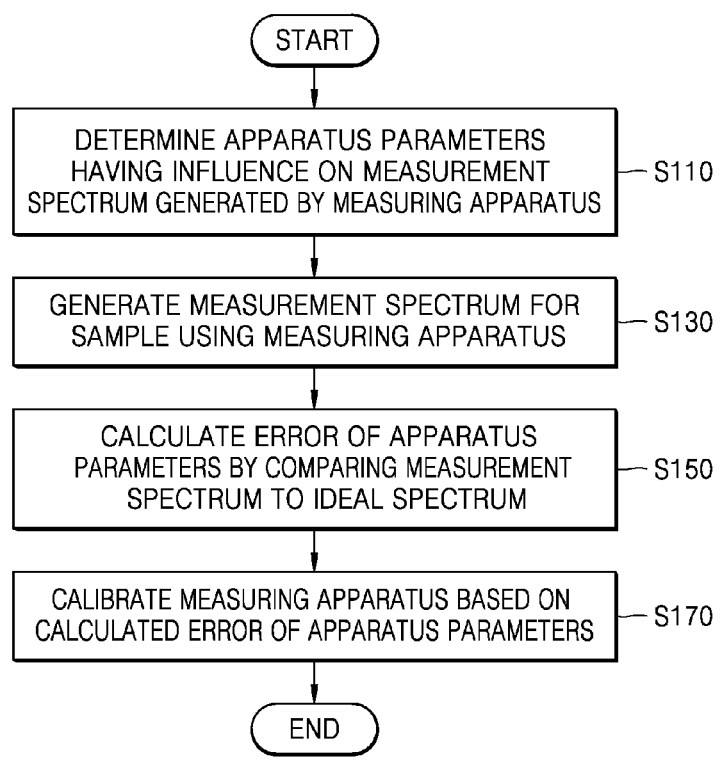
FIG. 1 is a flowchart of a method of calibrating a measuring apparatus, according to an exemplary embodiment of the inventive concept.

Exemplary embodiments of the inventive concept will be described more fully hereinafter with reference to the accompanying drawings. Like reference numerals may refer to like elements throughout the accompanying drawings.

FIG. 1 is a flowchart of a method of calibrating a measuring apparatus, according to an exemplary embodiment of the inventive concept.

Referring to FIG. 1, apparatus parameters having an influence on a spectrum (also referred to herein as a measurement spectrum) are determined in a measuring apparatus at operation S110. The measuring apparatus may be, for example, an apparatus that generates a spectrum based on light reflected from a measurement target after the measurement target is exposed to light generated by the measuring apparatus. The measuring apparatus may further analyze the generated spectrum, and acquire physical characteristics of the measurement target including, for example, information about a thickness of the measurement target or the shape (e.g., the three-dimensional (3D) shape) of the measurement target. Examples of the measuring apparatus include, for example, a spectroscopic ellipsometry (SE) apparatus, a spectroscopic reflectometry (SR) apparatus, an X-ray photoelectron spectroscopy (XPS) apparatus, an X-Ray Reflectometry (XRR) apparatus, an ultraviolet photoelectron spectroscopy (UPS) apparatus, etc. However, the measuring apparatus is not limited thereto. For example, the measuring apparatus may include all types of apparatuses that are capable of generating a spectrum based on reflected light, and capable of measuring a measurement target based on the generated spectrum.

Examples of the measurement target include devices from which information about a thickness or 3D shape may be acquired through a spectrum analysis. Examples of the measurement target include various devices such as, for example, a semiconductor device, a wafer, a liquid crystal display (LCD) panel, and a thin film transistor (TFT) panel.

The apparatus parameters refer to parameters that are determined to have an influence on a spectrum generated by the measuring apparatus when the measurement target is exposed to light generated by the measuring apparatus. For example, when there is an error in at least one of various elements of a measuring apparatus, a normal (e.g., an expected/ideal) spectrum of the measurement target may not be generated, and the measurement target may not be accurately measured. If states of all elements of the measuring apparatus are determined to be apparatus parameters of the measuring apparatus, excessive calculations and time may be consumed to acquire an error of subsequent apparatus parameters. Accordingly, in exemplary embodiments, only states of elements that are determined to have a substantial influence on a spectrum are categorized as apparatus parameters. That is, according to exemplary embodiments, only some of the available states of elements (e.g., the states of elements that have a relatively substantial influence on a spectrum compared to the states of other elements that only have a relatively negligible influence on the spectrum) are determined to be the apparatus parameters. For example, in exemplary embodiments, states of elements that do not have a substantial influence on a spectrum may be ignored when determining apparatus parameters to be used to calibrate the measuring apparatus. The apparatus parameters will be described in detail with reference to FIGS. 2 and 8 to 11C.

After determining the apparatus parameters, a measurement spectrum of a sample is generated using the measuring apparatus at operation S130. The measurement spectrum may be generated by exposing the measurement target on the sample to light generated by a light source of the measuring apparatus, and sensing light reflected from the sample through a sensor of the measuring apparatus. For example, in the calibration method according to an exemplary embodiment, a measurement spectrum of the intensity of reflected light may be generated using an SE apparatus. The sample may be, for example, a bare wafer on which a semiconductor process has not been performed. However, the sample is not limited to a bare wafer. The measurement spectrum will be described in detail with reference to FIGS. 3A and 3B.

After generating the measurement spectrum, an error of the apparatus parameters is calculated by comparing the measurement spectrum to an ideal spectrum at operation S150. The ideal spectrum may be acquired through spectrum modeling, and may correspond to the apparatus parameters in an ideal state (e.g. the ideal spectrum may correspond to a reference value of the apparatus parameters in an ideal state). For example, the reference value of the apparatus parameters may be a value of the apparatus parameters when the elements are in a normal state. The ideal spectrum may be automatically determined based on spectrum modeling when the sample is determined. The error of the apparatus parameters may be quantified to a specific value. The calculation of the error of the apparatus parameters will be described in detail with reference to FIGS. 12A to 12D.

After calculating the error of the apparatus parameters, the measuring apparatus is calibrated based on the calculated error at operation S170. The measuring apparatus may be calibrated based on the calculated error of the apparatus parameters using an inverse operation. The inverse operation may be performed, for example, through a process of quantifying the error of the apparatus parameters as values of a matrix, obtaining an inverse matrix of the matrix, and then multiplying the inverse matrix by a row matrix-type equation that represents the measurement spectrum. In this manner, as the spectrum of the measuring apparatus is calibrated through an inverse operation based on the error of the apparatus parameters, a correction for an error component of the measuring apparatus is performed. According to exemplary embodiments, it is not necessary to perform a subsequent calibration process for the measuring apparatus. The calibration of the measuring apparatus using an inverse operation will be described in detail with reference to FIGS. 13A to 15C.

The calibration method according to exemplary embodiments may perform a fundamental correction on error components of the measuring apparatus by determining apparatus parameters having an influence (e.g., a substantial influence) on a spectrum, and calibrating the measuring apparatus based on the calculated error of the apparatus parameters. Accordingly, in exemplary embodiments, an additional calibration process for the measuring apparatus is not needed, resulting in a decrease in the number of steps performed during the calibration method. In addition, when a plurality of measuring apparatuses is used, errors between the measuring apparatuses may be reduced by performing the above-described calibration method on each measuring apparatus. Accordingly, the same measurement results may be substantially acquired with respect to a measurement target when a plurality of measuring apparatuses is utilized, and the reliability of the measurement of characteristics of the device may be improved.

In a comparative example, to correct errors between measuring apparatuses, a specific sample is measured by each of the measuring apparatuses, and correction is performed by adding or subtracting an error to or from a measured result, based on any one measuring apparatus. However, since such a sample-based apparatus error correction technique is applied to every process step, an error correction process is performed a large number of times per product (e.g., an error correction process may be performed more than 100 times per product in certain scenarios). Further, since this technique functions by causing averages to be consistent with one another, a measurement may not be accurate, since tendencies in the measuring apparatuses do not coincide with one another. For example, to measure a several nanometer (nm) ultrafine shape or thickness in a semiconductor production line, tens to hundreds of SE apparatuses may be operated, and a large number of steps (e.g., 100 or more steps) may be monitored per product. As a result, such an error correction technique may consume an excessive amount of time to perform an error correction of the SE apparatuses, and reliability of the measurement may be lowered, resulting in an increase in the number of defects and a decrease in the yield of the product. This error correction technique may be referred to as spectral error-based calibration (SEBC).

According to exemplary embodiments of the present inventive concept, a calibration method includes identifying and correcting error components of a measuring apparatus itself that result in the distortion of a spectrum generated by the measuring apparatus. The calibration method according to exemplary embodiments of the present inventive concept may improve upon existing apparatus error correction techniques, which operate by moving the same sample for each process step to perform calibration between measuring apparatuses. Exemplary embodiments may correct error states of the measuring apparatuses through one calibration process. As a result, the measuring apparatuses may maintain the same apparatus state until a time at which the use of the measuring apparatuses is completed after calibration.

Figure 2:
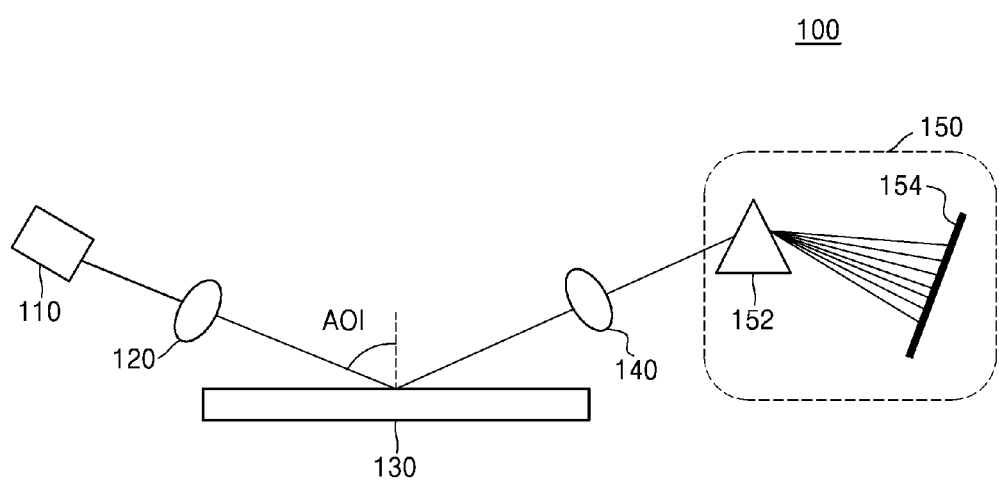
FIG. 2 is a diagram showing a configuration of a spectroscopic ellipsometry (SE) apparatus to which the calibration method of FIG. 1 may be applied.

FIG. 2 is a diagram showing a configuration of an SE apparatus 100 to which the calibration method of FIG. 1 may be applied.

Referring to FIG. 2, the SE apparatus 100 may include a light source 110, a polarizer 120, a sample 130, an analyzer 140, and a sensor 150.

The light source 110 may generate light having a specific wavelength or broadband wavelength. The polarizer 120 may convert light from the light source 110 into polarized light, and the sample 130 may be exposed to the polarized light. The polarizer 120 may be, for example, a polarizing plate that converts incident light into linearly polarized light and emits the polarized light. The sample 130, which is a measurement target for calibration of the SE apparatus 100, may be, for example, a bare wafer. However, the sample 130 is not limited to a bare wafer. The analyzer 140 may be an apparatus that checks a polarization state of light reflected from the sample 130. A beam of the light reflected from the sample 130 may be elliptically polarized light. Accordingly, the analyzer 140 may be an apparatus that checks an elliptical polarization state. A polarizing plate may be used in the analyzer 140. At least one of the polarizer 120 and the analyzer 140 may be configured to rotate on an optical axis during a measurement operation.

The sensor 150 may be an apparatus that receives reflected light incident after passing through the analyzer 140, and that detects characteristics of the light including, for example, the intensity of the light, with respect to each wavelength. The sensor 150 may include a spectral device 152 and an array detector 154. The array detector 154 may include a plurality of detectors at different positions. The spectral device 152 may split incident light into beams of light for each wavelength, and the detectors at different positions may be exposed to the beams of light. The spectral device 152 may be, for example, a prism. The array detector 154 may be a multi-channel detector capable of simultaneously measuring light having various wavelengths, and may be configured by a charge coupled device (CCD) or a photodiode array (PDA).

The SE apparatus 100 may include an arithmetic system. The arithmetic system may be implemented by, for a example, a processor and a memory. The arithmetic system may receive measured data from each detector of the array detector 154 and may process the received data in an appropriate manner. The arithmetic system may generate a control signal that controls an angle orientation of the polarizer 120 and/or the analyzer 140, or an angle orientation of another element of the SE apparatus 100 including, for example, a wafer positioning system in which the sample 130 is placed. The arithmetic system may receive data indicating an angle orientation from a position sensor for the polarizer 120 and a position sensor for the analyzer 140, and may process the data indicating the angle orientation.

In the SE apparatus 100 having a configuration described above, the apparatus parameters may be, for example, parameters indicating a state of the light source 110, a state of the polarizer 120, an angle of incidence (AOI), a state of the analyzer 140, and a state of the sensor 150. The state of the light source 110 may denote a light source wavelength or a numerical aperture (NA), the state of the polarizer 120 may denote the angle of the polarizer 120, and the state of the analyzer 140 may denote the angle of the analyzer 140. The AOI may denote an incident angle of light that is incident from the polarizer 120 onto the sample 130. The state of the sensor 150 may be an alignment state of the sensor 150. In the SE apparatus 100, the state of the light source 110, the state of the polarizer 120, and the state of the analyzer 140 may not greatly deviate from a reference or normal state. Accordingly, the state of the light source 110, the state of the polarizer 120, and the state of the analyzer 140 may not have a substantial influence on a spectrum. In contrast, the AOI and the alignment state of the sensor 150 may sometimes deviate from a reference angle and a reference alignment state, and thus may have a substantial influence on a spectrum.

As described above, if the states of all elements of a measuring apparatus are determined to be apparatus parameters (e.g., if the states of all elements of a measuring apparatus are taken into consideration during calibration), excessive time may be consumed in calculating an error of the apparatus parameters and calibrating a spectrum (e.g., through an inverse operation). In addition, certain elements of the measuring apparatus may have a negligible influence on a spectrum, and thus, may not have an impact relating to calibration. Accordingly, in the calibration method according to an exemplary embodiment, instead of determining states of all elements of a measuring apparatus as apparatus parameters, only states of some elements having a an influence (e.g., a substantial influence) on a spectrum generated by the measuring apparatus may be determined to be the apparatus parameters. For example, when the SE apparatus 100 is used as a measuring apparatus, the AOI and the alignment state of the sensor 150 may be determined to be apparatus parameters, and the state of the light source 110, the state of the polarizer 120, and the state of the analyzer 140 may not be determined to be apparatus parameters.

A first step 1 for matching determined parameters to a measurement spectrum Sm is represented as the following equation:

$$Sm = f(AOI) * f(\text{alignment state of sensor}) \quad \text{Step 1:}$$

The first step Step 1 denotes that parameters which do not have a substantial influence on a spectrum are discarded, and only the AOI and the alignment state of the sensor 150, which have a substantial influence on the spectrum, are determined to be apparatus parameters. The first step Step 1 may correspond to operation S110 shown in FIG. 1. The influence which the AOI and the alignment state of the sensor 150 have on a spectrum will be described in detail with reference to FIGS. 8 to 11C.

The state of the sample 130 may be included as a parameter having a substantial influence on the spectrum. The state of the sample 130 may include, for example, a refractive index, a dielectric function tensor, the nominal thicknesses of all layers, the order of layers, etc. The state of the sample 130 may be distinguished from apparatus parameters. For example, although both the apparatus parameters and the sample parameter may be used in spectrum modeling, only the apparatus parameters may be used in correcting an error component of a measuring apparatus. The reason for this is that states of samples which are used for error correction of a measuring apparatus are the same.

Figure 3A:
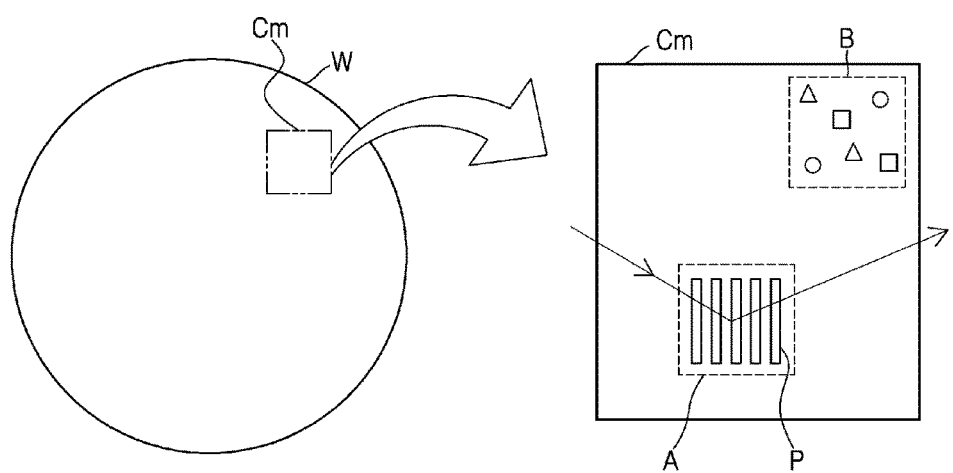
FIGS. 3A and 3B are a conceptual diagram and a graph, respectively, which show a process of generating a measurement spectrum using the SE apparatus of FIG. 2.
Figure 3B:
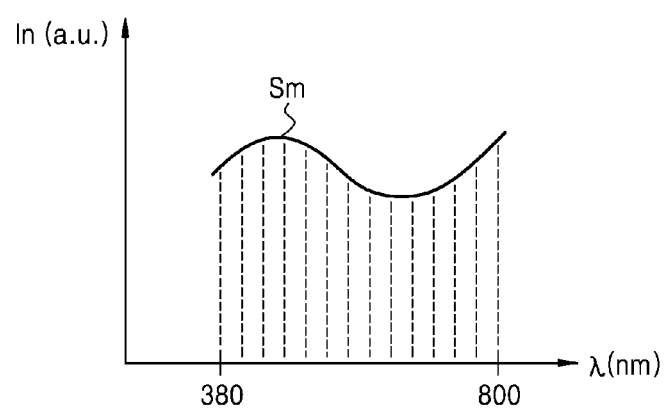

FIGS. 3A and 3B are a conceptual diagram and a graph, respectively, which show a process of generating a measurement spectrum using the SE apparatus 100 of FIG. 2. FIG. 3A shows a wafer W including a plurality of semiconductor chips, and includes an enlarged view of a specific semiconductor chip Cm in the wafer W. FIG. 3B shows a graph of a measurement spectrum generated by measuring a portion of the semiconductor chip Cm using the SE apparatus 100.

Referring to FIGS. 3A and 3B, the SE apparatus 100 of FIG. 2 may be used to measure the thicknesses or 3D shapes of patterns formed in the semiconductor chip Cm. The SE apparatus 100 may further be used to measure repeating patterns P, such as a line-and-space pattern, rather than measuring all patterns of the semiconductor chip Cm. For example, as shown in FIG. 3A, the semiconductor chip Cm may include a repeating pattern area A including the repeating patterns P formed therein, and a non-repeating pattern area B including arbitrary patterns formed therein. The SE apparatus 100 may be used to measure the shapes or thicknesses of the repeating patterns P of the repeating pattern area A.

As shown in FIG. 3B, the SE apparatus 100 may sense light reflected from a measurement target (e.g., the repeating pattern area A of the semiconductor chip Cm), and may generate a measurement spectrum Sm that represents the intensity of light with respect to each wavelength. In FIG. 3B, the X-axis of the graph indicates a wavelength of a reflected light and the unit of the X axis may be nm, and the Y axis of the graph indicates the intensity of the reflected light and the unit of the Y axis may be an arbitrary unit (a.u.). Although the measurement spectrum Sm is generated by the SE apparatus 100, the thicknesses or shapes of the repeating patterns P of the semiconductor chip Cm are not directly determined. For example, information about the thicknesses or shapes of the repeating patterns P of the semiconductor chip Cm may be determined by comparing the measurement spectrum Sm with an ideal spectrum(s) including, for example, spectrums acquired through spectrum modeling, which will be described with reference to FIGS. 4A to 4C.

FIGS. 4A to 4C, 5 and 6 are graphs showing spectrum modeling, which is used in the calibration method of FIG. 1, and a principle of measuring a measurement target through spectrum modeling.

Figure 4A:
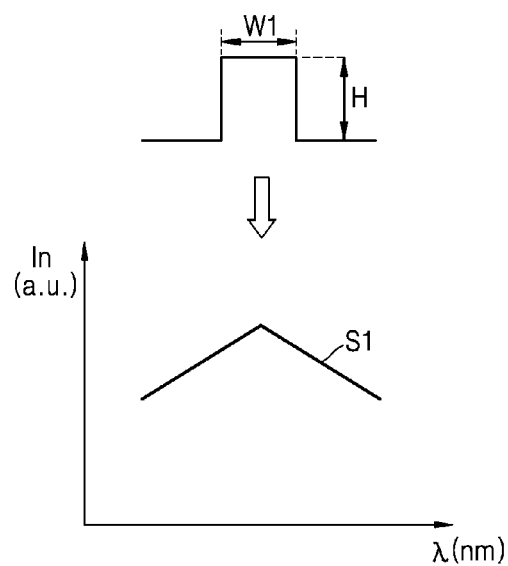
FIGS. 4A to 4C, 5 and 6 are graphs showing spectrum modeling, which is used in the calibration method of FIG. 1, and a principle of measuring characteristics of a device through spectrum modeling.
Figure 4B:
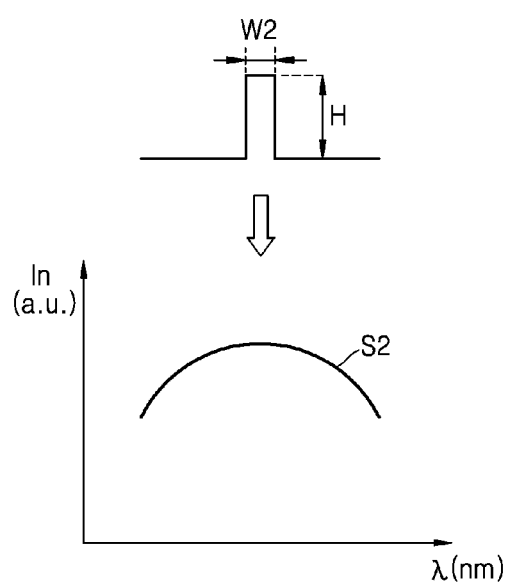
Figure 4C:
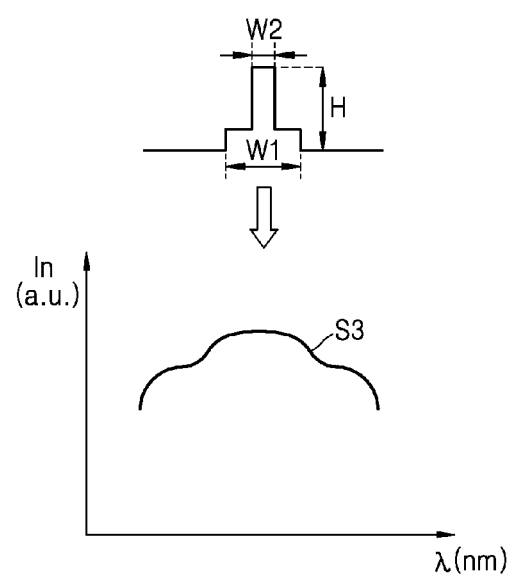

Referring to FIGS. 4A-4C, 5 and 6, patterns of a sample may be modeled by a specific spectrum through spectrum modeling, which is referred to as electromagnetic modeling. Hereinafter, a spectrum acquired through spectrum modeling is referred to as a model spectrum. For example, FIG. 4A shows a model spectrum S1 for a pattern having a first width W1 and a first height H, FIG. 4B shows a model spectrum S2 for a pattern having a second width W2 and the first height H, and FIG. 4C shows a model spectrum S3 for a pattern having a lower portion having the first width W1, an upper portion having the second width W2, and the first height H.

FIGS. 4A to 4C illustrate examples showing that patterns may be modeled by model spectrums S1, S2, and S3 having different forms according to the size or form of each pattern. However, exemplary embodiments are not limited thereto. For example, according to exemplary embodiments, spectrum modeling may be influenced by various parameters as well as the size or form of a pattern, and spectrum modeling may be influenced by states (e.g., apparatus parameters as described above) of elements of a measuring apparatus and a state (e.g., a sample parameter as described above) of a measurement target.

Figure 5:
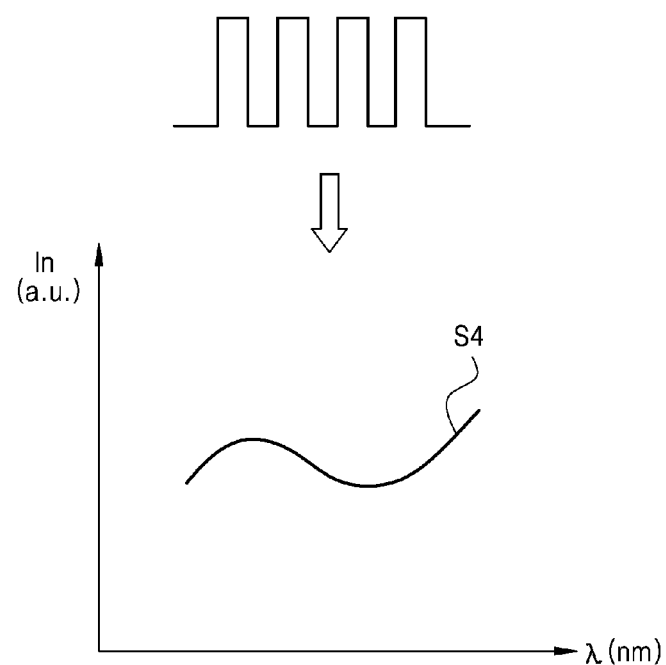

FIG. 5 is a diagram showing a model spectrum S4 acquired through spectrum modeling. The model spectrum S4 is different from the model spectrums S1, S2, and S3 of FIGS. 4A to 4C. For example, each of the model spectrums S1, S2, and S3 of FIGS. 4A to 4C is a model spectrum acquired through spectrum modeling with respect a single pattern, whereas the model spectrum S4 of FIG. 5 is a model spectrum acquired through spectrum modeling with respect to repeating patterns.

The form of the model spectrum S4 of FIG. 5 is similar to the form of the measurement spectrum Sm shown in FIG. 3B. Accordingly, it may be understood that the measurement spectrum Sm of FIG. 3B is a measurement spectrum of repeating patterns.

Figure 6:
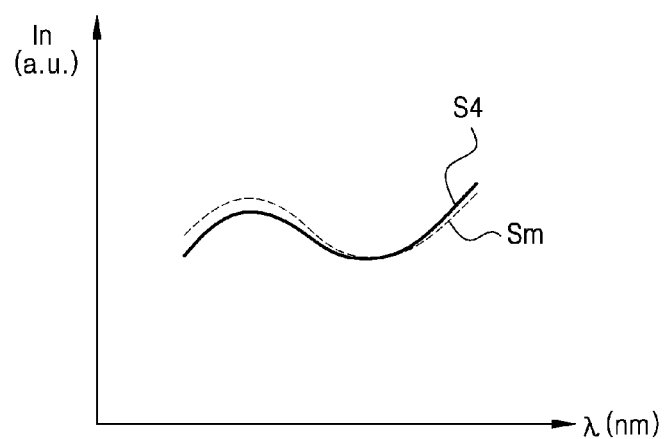

FIG. 6 shows a comparison between the measurement spectrum Sm of FIG. 3B and the model spectrum S4 of FIG. 5. The measurement spectrum Sm of FIG. 3B and the model spectrum S4 of FIG. 5 are not completely consistent with each other and include some differences. If the SE apparatus 100 does not include an error component and the measurement spectrum Sm of FIG. 3B and the model spectrum S4 of FIG. 5 are completely consistent with each other, information about the thicknesses or shapes of the repeating patterns P of the semiconductor chip Cm may be acquired using information of sample parameters used in the modeling of the model spectrum S4 of FIG. 5. However, as shown in FIG. 6, since the measurement spectrum Sm of FIG. 3B and the model spectrum S4 of FIG. 5 include some differences and the SE apparatus 100 may include an error element, the information about the sample parameters used in the modeling of the model spectrum S4 of FIG. 5 may not be accurately used to represent information about the thicknesses or shapes of the repeating patterns P.

A principle of generating a measurement spectrum using the SE apparatus 100 and obtaining information about the thickness or shape of a measurement target through a comparison between the measurement spectrum and a model spectrum acquired by spectrum modeling according to exemplary embodiments is as follows.

First, a signal that is received by each detector of the array detector 154 of FIG. 2 while the polarizer 120 of FIG. 2 is rotated at a constant speed may be represented as the intensity of light based on time, as in equation (1):

$$I(t)=I_0[I+\alpha^*\cos(2\omega t-P_0)+\beta^*\sin(2\omega t-P_0)] \quad (1)$$

In equation (1), $I_0$ is a constant that is dependent on the intensity of light which is emitted from the light source 110 of FIG. 2, $\omega$ is a rotational angular velocity of the polarizer 120, $P_0$ is an angle between an optical axis of the polarizer 120 and a plane of incidence at an initial time (t=0), and $\alpha$ and $\beta$ are values that are defined by equations (2) and (3):

$$\alpha=[\tan^2(\Psi)-\tan^2(A-A_0)]/[\tan^2(\Psi)+\tan^2(A-A_0)] \quad (2)$$

$$\beta=[2\tan(\Psi)*\cos(\Delta)*\tan(A-A_0)]/[(\tan^2(\Psi)+\tan^2(A-A_0)] \quad (3)$$

In equations (2) and (3), $\tan(\Psi)$ is the size of a composite ratio between a 'p' component and an 's' component of light reflected from a sample, and $\Delta$ is the phase of the composite ratio between the 'p' component and the 's' component of the light reflected from the sample. The 'p' component denotes a component of polarized light in which an electric field is on the plane of incidence, and the 's' component denotes a component of polarized light in which an electric field is perpendicular to the plane of incidence. 'A' is an angle of a nominal analyzer (e.g., the analyzer 140 of FIG. 2), for example, an orientation angle that is supplied from a position sensor for an analyzer. $A_0$ is an offset of an actual orientation angle of the analyzer from a read 'A'. For example, $A_0$ may not be zero due to a mechanical misalignment.

Based on equations (1), (2) and (3), values of $\alpha$ and $\beta$ may be determined based on measured values of a specific sample which is measured by the SE apparatus 100 of FIG. 2. Accordingly, measured values $\alpha_{meas}$ and $\beta_{meas}$ of a specific sample may be determined based on data detected by a sensor.

Ellipsometry is a method of indirectly measuring physical characteristics of an inspection target sample. Accordingly, in most cases, the measured values $\alpha_{meas}$ and $\beta_{meas}$ may not be used for directly determining physical characteristics of a sample. To account for this, modeling for estimating the measured values $\alpha_{meas}$ and $\beta_{meas}$ may be introduced, and model values may be generated by the modeling.

As exemplified in equations (4) and (5), each of the model values may include an apparatus parameter $P_{sys}$ related to an apparatus and a sample parameter $P_{sam}$ related to a sample:

$$\alpha_{model}=f(P_{sys},P_{sam}) \quad (4)$$

$$\beta_{model}=g(P_{sys},P_{sam}) \quad (5)$$

The apparatus parameter $P_{sys}$ may be a parameter that is used to characterize a measuring apparatus. For example, as described above, apparatus parameters of an SE apparatus may include a wavelength of a light source, NA, AOI, a polarizer angle, an analyzer angle, etc. The sample parameter $P_{sam}$ may be a parameter that is used to characterize a sample. For example, the sample parameter $P_{sam}$ may include a refractive index, a dielectric function tensor, the nominal thicknesses of all layers, the order of layers, etc. Physical characteristics of a sample that is an inspection target may be determined by an iteration procedure (e.g., regression). Modeling may be performed until a set of sample parameters, which bring about a close match between the model values $\alpha_{model}$ and $\beta_{model}$ and the measured values $\alpha_{meas}$ and $\beta_{meas}$ while values of the sample parameters are changed, is determined. The measured values $\alpha_{meas}$ and $\beta_{meas}$ may correspond to the measurement spectrum described above, and the model values $\alpha_{model}$ and $\beta_{model}$ may each correspond to the model spectrum.

Mismatching between a model value and a measured value may correspond to a spectroscopic error. Spectroscopic errors $\delta\alpha$ and $\delta\beta$ may be represented by equations (6) and (7):

$$\delta\alpha=\alpha_{meas}-\alpha_{model} \quad (6)$$

$$\delta\beta=\beta_{meas}-\beta_{model} \quad (7)$$

Values of apparatus parameters of a measuring apparatus may be calibrated so that a difference between a spectroscopic error related to a measurement of a sample by the measuring apparatus and a spectroscopic error related to a measurement of the sample by a reference measuring apparatus is minimized. Such an SEBC method may increase consistency between different measuring apparatuses by minimizing a spectroscopic error difference between the different measuring apparatuses by using a predetermined sample or a set of samples. However, as described above, since the SEBC method is typically applied to each process step, a large number of calibration processes (e.g., 100 or more calibration processes) is performed per product with respect to each measuring apparatus. In addition, the SEBC method matches only averages with one another, and may not result in accurate measurements since tendencies in the measuring apparatuses may not coincide with one another.

Figure 7A:
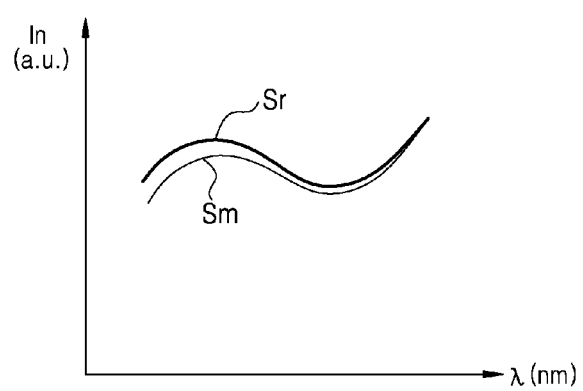
FIGS. 7A and 7B are graphs illustrating a principle in which the thickness of a measurement target is measured differently for each wavelength due to the abnormality of an alignment state of a sensor in an SE apparatus.
Figure 7B:
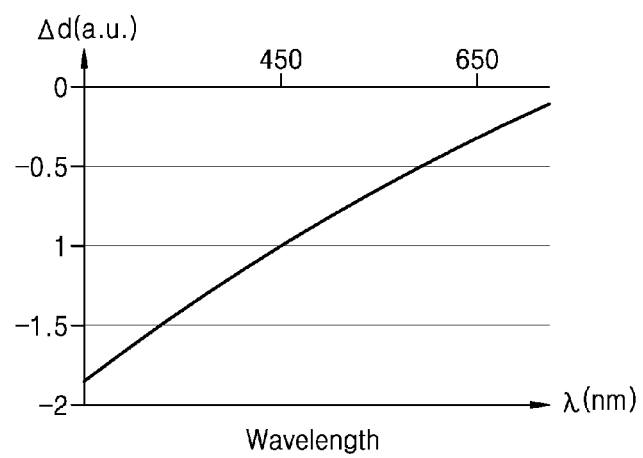

FIGS. 7A and 7B are graphs illustrating a principle in which the thickness of a measurement target is measured differently for each wavelength due to the abnormality of an alignment state of a sensor in an SE apparatus.

FIG. 7A shows a measurement spectrum Sm generated by an SE apparatus in which the abnormality of an alignment state of a sensor (e.g., the sensor 150 of FIG. 2) has occurred, and a reference spectrum Sr. The reference spectrum Sr may be a spectrum corresponding to a case in which the alignment state of the sensor is normal. FIG. 7B is a graph showing that a thickness error Δd of a sample varies depending on a wavelength based on a difference between the reference spectrum Sr and the measurement spectrum Sm of FIG. 7A.

When the measurement spectrum Sm is substantially the same as the reference spectrum Sr, the thickness error Δd of the sample, acquired based on the measurement spectrum Sm of the SE apparatus, may be constant regardless of the wavelength. For example, the thickness error Δd of the sample may have the form of a graph having a constant height in the Y-axis.

However, as shown in FIG. 7A, the measurement spectrum Sm may have a form in which the shorter the wavelength is, the lower the intensity becomes with respect to the reference spectrum Sr. The measurement spectrum Sm having this form may be caused due to, for example, the abnormality of an alignment state of a sensor. For example, the abnormality of an alignment state of a sensor may correspond to a state in which the array detector 154 of FIG. 2 distances itself from the spectral device 152 as the array detector 154 approaches a short wavelength. Since the intensity of the measurement spectrum Sm with respect to the reference spectrum Sr becomes lower as the wavelength of the measurement spectrum Sm becomes shorter, the thickness error Δd may increase when the wavelength shortens, resulting in the graph shown in FIG. 7B. As a result, the thickness error Δd of the sample may be approximately estimated by generating the measurement spectrum Sm and comparing the generated measurement spectrum Sm to the reference spectrum Sr.

Figure 8:
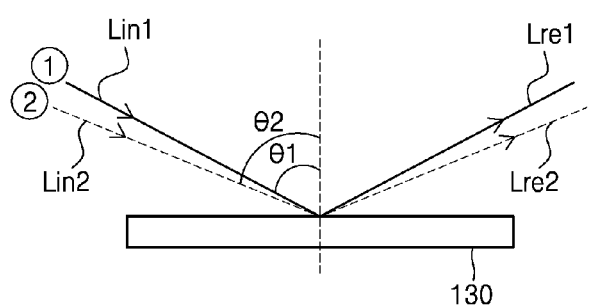
FIGS. 8 and 9 are a conceptual diagram and a graph, respectively, which show an apparatus parameter used in the calibration method of FIG. 1, and an effect caused by the apparatus parameter.
Figure 9:
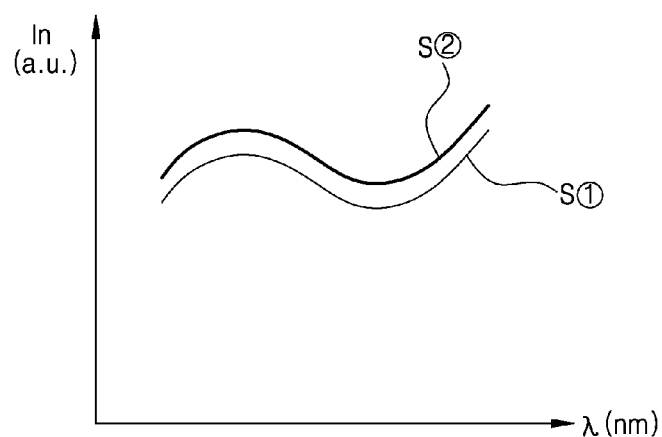

FIGS. 8 and 9 are a conceptual diagram and a graph, respectively, which show an apparatus parameter used in the calibration method of FIG. 1, and an effect caused by the apparatus parameter.

Referring to FIG. 8, with regard to the SE apparatus 100 of FIG. 2, first light ① with a first AOI θ1 is reflected by a sample 130 and second light ② with a second AOI θ2 is reflected by the sample 130. Here, the second AOI θ2 may be greater than the first AOI θ1, Lin1 and Lin2 may denote incident light of the first light ① and incident light of the second light ②, respectively, and Lre1 and Lre2 may denote reflected light of the first light ① and reflected light of the second light ②, respectively.

FIG. 9 shows a spectrum S① for the reflected light of the first light ① and a spectrum S② for the reflected light of the second light ②. As shown in FIG. 9, the form of the spectrum S① for the reflected light of the first light ① is different from that of the spectrum S② for the reflected light of the second light ②. Thus, it may be understood that when the first AOI θ1 and the second AOI θ2 are different from each other, the form of the spectrum S① is different from that of the spectrum S②. Accordingly, an AOI may be determined to be an apparatus parameter that is used in the calibration method of the SE apparatus 100.

In general, since the amount of light that is reflected from a sample increases as an AOI increases, the intensity of reflected light with a relatively large AOI may be greater than that of reflected light with a relatively small AOI. Accordingly, in the spectrums S① and S② of FIG. 9, the intensity of the reflected light Lre2 of the second light ② may be greater than that of the reflected light Lre1 of the first light ①. However, since a reflective index varies depending on a wavelength and a relative position of the analyzer 140 of FIG. 2 is changed depending on an AOI, spectrums based on the AOI may have complex forms, unlike the forms of the spectrums S① and S② of FIG. 9.

In both a measurement spectrum generated by an SE apparatus and a model spectrum acquired through spectrum modeling, the form of a spectrum may be changed depending on an AOI.

FIGS. 10A to 10D and 11A to 11C are conceptual diagrams and graphs showing other apparatus parameters used in the calibration method of FIG. 1, and an effect caused by the other apparatus parameters.

Figure 10A:
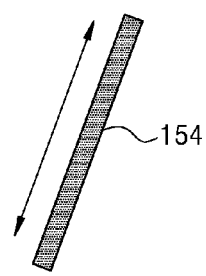
FIGS. 10A to 10D and 11A to 11C are conceptual diagrams and graphs showing other apparatus parameters used in the calibration method of FIG. 1, and an effect caused by the other apparatus parameters.
Figure 10B:
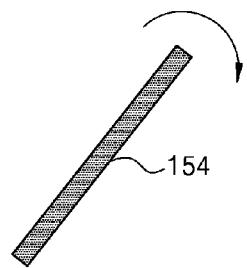
Figure 10C:
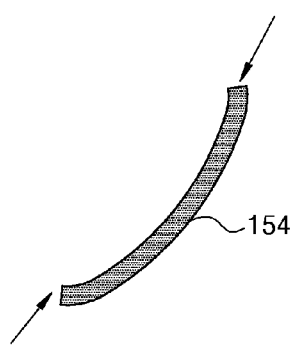
Figure 10D:
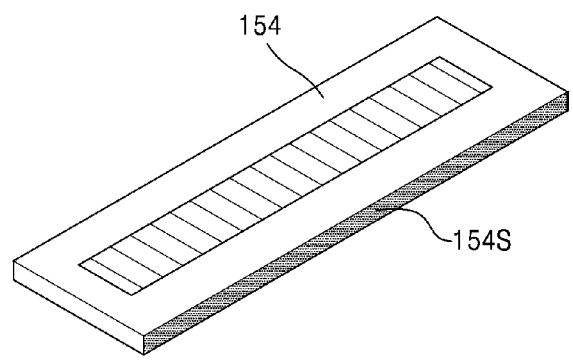

FIGS. 10A to 10C show an alignment state abnormality of the sensor 150, and particularly of the array detector 154, in the SE apparatus 100 of FIG. 2. For example, FIG. 10A shows a position state abnormality of the array detector 154, FIG. 10B shows a rotation state abnormality of the array detector 154, and FIG. 10C shows a twisted state abnormality of the array detector 154. FIG. 10D is a perspective view of the array detector 154. Parts shown in FIGS. 10A to 10C may correspond to the side 154s of the array detector 154 of FIG. 10D.

The position state abnormality shown in FIG. 10A may be an abnormality caused as the array detector 154 moves in a straight line direction as indicated by the arrow in FIG. 10A. The rotation state abnormality shown in FIG. 10B may be an abnormality caused as the array detector 154 rotates as indicated by the arrow in FIG. 10B. The twisted state abnormality shown in FIG. 10C may be an abnormality caused as the array detector 154 is bent and twisted by a force applied from both sides of the array detector 154 as indicated by the arrow in FIG. 10C. As illustrated in the SE apparatus 100 of FIG. 2, the array detector 154 detects, by position, light separated through the spectral device 152 of FIG. 2 according to a wavelength. For example, each detector of the array detector 154 at various positions detects light having a wavelength corresponding thereto. Accordingly, when the alignment state abnormality as shown in FIGS. 10A to 10C occurs, a spectrum may be changed due to the alignment state abnormality.

Figure 11A:
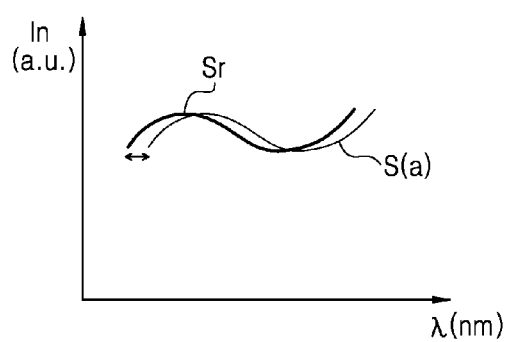
Figure 11B:
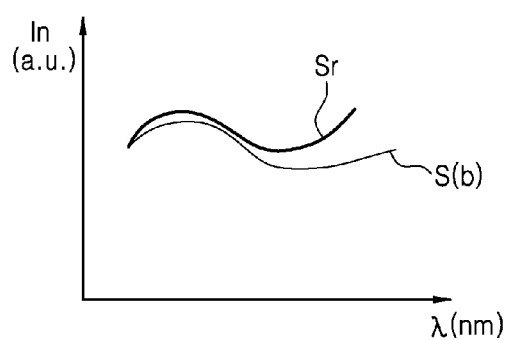
Figure 11C:
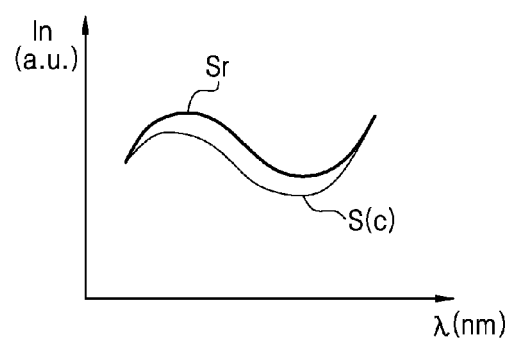

FIGS. 11A to 11C illustrate spectrums corresponding to alignment state abnormalities of FIGS. 10A to 10C. For example, FIG. 11A shows a spectrum corresponding to the position state abnormality of the array detector 154 shown in FIG. 10A, FIG. 11B shows a spectrum corresponding to the rotation state abnormality of the array detector 154 shown in FIG. 10B, and FIG. 11C shows a spectrum corresponding to the twisted state abnormality of the array detector 154 shown in FIG. 10C. Here, Sr denotes a reference spectrum, and S(a), S(b), and S(c) denote a spectrum corresponding to a position state abnormality of the array detector 154, a spectrum corresponding to a rotation state abnormality of the array detector 154, and a spectrum corresponding to a twisted state abnormality of the array detector 154, respectively. As shown in FIGS. 11A to 11C, a spectrum may vary depending on an alignment state abnormality of the sensor 150. Accordingly, the alignment state abnormality of the sensor 150 may be selected as an apparatus parameter that is used in the calibration method of the SE apparatus 100.

As shown in FIG. 11A, when there is a position state abnormality of the array detector 154, a detector at a long wavelength side detects more light as the array detector 154 moves in a horizontal direction. Thus the spectrum S(a) may move in the horizontal direction with respect to the reference spectrum Sr. However, when the array detector 154 moves in a direction opposite to the horizontal direction, the spectrum S(a) may also move in the direction opposite to the horizontal direction.

As shown in FIG. 11B, when there is a rotation state abnormality of the array detector 154, a detector at an upper side may become distant from the spectral device 152 of FIG. 2 as the array detector 154 rotates. Accordingly, the spectrum S(b) may have a form in which the spectrum S(b) is lowered in the horizontal direction with respect to the reference spectrum Sr and intensity In is reduced as a wavelength increases.

As shown in FIG. 11C, when there is a twisted state abnormality of the array detector 154, a detector at a center side may become distant from the spectral device 152 of FIG. 2 as the array detector 154 twists. Accordingly, the spectrum S(b) may have a form in which intensity In is reduced at a middle wavelength area with respect to the reference spectrum Sr.

Due to other parameters, spectrums corresponding to the alignment state abnormalities of FIGS. 10A to 10C may have forms that are different from those of the spectrums S(a), S(b), and S(c) of FIGS. 11A to 11C.

FIGS. 12A to 12D are graphs illustrating a principle of calculating an error of an apparatus parameter by comparing an ideal spectrum to a measurement spectrum.

Figure 12A:
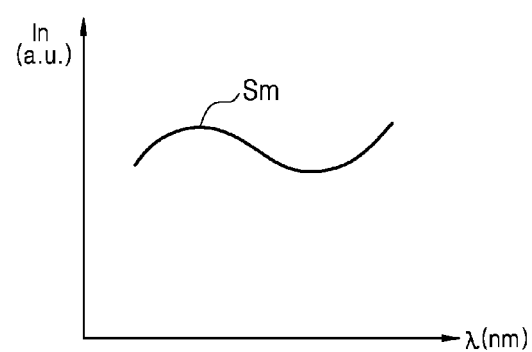
FIGS. 12A to 12D are graphs illustrating a principle of calculating an error of an apparatus parameter by comparing an ideal spectrum to a measurement spectrum.
Figure 12B:
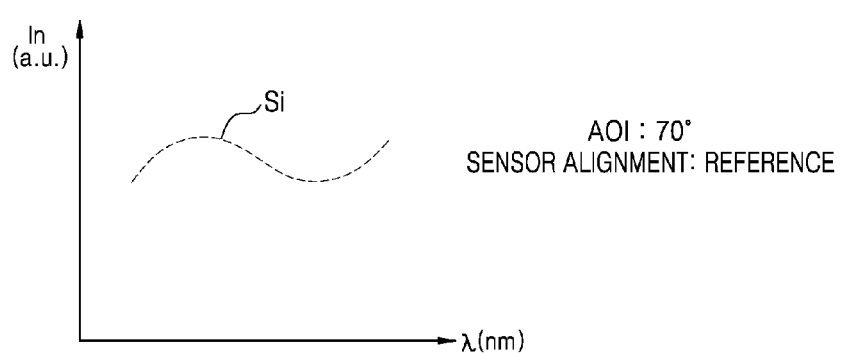
Figure 12C:
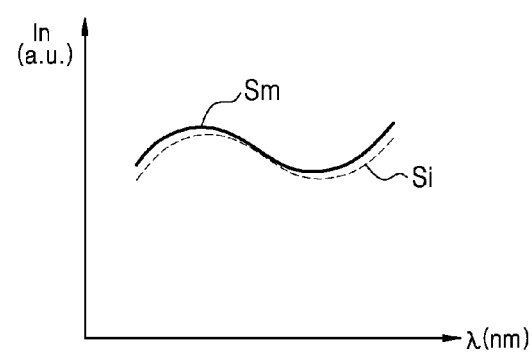
Figure 12D:
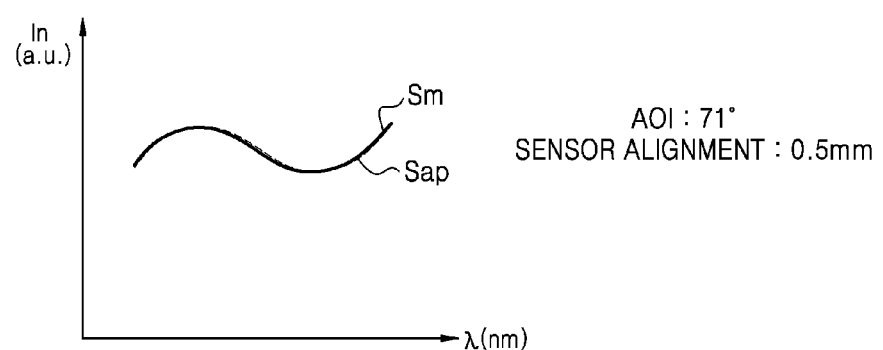

FIG. 12A shows a measurement spectrum Sm for a sample (e.g., the sample 130 of FIG. 2). The sample may be, for example, a bare wafer, which is measured using an SE apparatus (e.g., the SE apparatus 100 of FIG. 2). FIG. 12B shows an ideal spectrum Si acquired by spectrum modeling. FIG. 12C shows both the measurement spectrum Sm and the ideal spectrum Si. FIG. 12D shows an approximate spectrum Sap determined by approximating the measurement spectrum Sm.

As described above, the ideal spectrum Si may correspond to normal states of all elements of the SE apparatus (e.g., the ideal spectrum Si may correspond to an SE apparatus in which all elements are functioning properly without errors). For example, the ideal spectrum Si may correspond to a scenario in which the apparatus parameters are in a normal state or a reference state. For example, in an exemplary scenario, when the apparatus parameters include an AOI and an alignment state of a sensor (e.g. the sensor 150 of FIG. 2), a normal state of the AOI may be 70° and a normal state of the alignment state of the sensor may correspond to a reference position. The ideal spectrum Si may correspond to a case in which a very thin oxide layer is on the sample, e.g., a bare wafer. As described above, a state of a sample may also be used as a parameter for spectrum modeling. However, since the state of the sample is about the same in all measuring apparatuses, the state of the sample may be excluded from parameters used during the calibration of the measuring apparatus. The ideal spectrum may be automatically acquired when the sample is determined. For example, when a bare wafer is determined to be the sample, the ideal spectrum Si having a form as shown in FIG. 12B may be automatically acquired under an assumption that the apparatus parameters are in the normal state.

When comparing the ideal spectrum Si to the measurement spectrum Sm, there may be a difference between the spectrums, as shown in FIG. 12C. The difference may be caused as a result of the states of elements of the SE apparatus that measured the sample not being in a normal state. For example, the difference between the ideal spectrum Si and the measurement spectrum Sm may be caused due to an error relating to apparatus parameters of the SE apparatus, including, for example, an error in the AOI or the alignment state of the sensor. When the ideal spectrum Si and the measurement spectrum Sm are consistent with each other, apparatus parameters of the SE apparatus that measured the sample are in a normal state. For example, in the case described above, when the ideal spectrum Si and the measurement spectrum Sm match each other, the AOI of the SE apparatus is 70° and the alignment state of the sensor corresponds to the reference position.

When there is a difference between the ideal spectrum Si and the measurement spectrum Sm, spectrum modeling is performed. Values of the apparatus parameters are changed during the spectrum modeling process to determine the approximate spectrum Sap. The approximate spectrum Sap is a spectrum that is obtained when a match between the measurement spectrum Sm and the ideal spectrum Si occurs. For example, the approximate spectrum Sap is determined by changing values of the apparatus parameters during a spectrum modeling process until the measurement spectrum Sm matches the ideal spectrum Si. The reference value of the apparatus parameters corresponding to the ideal spectrum Si may then be subtracted from the values of the apparatus parameters used to obtain the approximate spectrum Sap (e.g., the values of the apparatus parameters that result in a match between the measurement spectrum Sm and the ideal spectrum Si). For example, as shown in FIG. 12D, the approximate spectrum Sap that approximates the measurement spectrum Sm is determined through spectrum modeling. The approximate spectrum Sap may correspond to a model spectrum. After the approximate spectrum Sap is determined, values of apparatus parameters that are used to obtain the approximate spectrum Sap are identified. For example, the AOI, which is an apparatus parameter corresponding to the approximate spectrum Sap, may be 71°, and the alignment state of the sensor, which is another apparatus parameter corresponding to the approximate spectrum Sap, may correspond to 0.5 mm horizontal movement from a reference position (e.g., a 0.5 mm deviation in the horizontal direction relative to the reference position). Thus, the SE apparatus that measured the sample is in a state in which the AOI is deviated by 1° from a reference angle and the alignment state of the sensor is deviated by 0.5 mm from the reference position. Accordingly, errors of the apparatus parameters may be quantified as specific values. For example, an error of the AOI may be quantified as 1°, and an error of the alignment state of the sensor may be quantified as 0.5 mm.

A second step Step 2 for quantifying errors of apparatus parameters through spectrum modeling and matching the errors of the apparatus parameters to a measurement spectrum Sm is represented by the following equation:

$$Sm = Si^* (\Delta_{AOI})^* (\Delta_{Sen-Al})^* (\Delta_{Re}) \quad \text{Step 2:}$$

Here, '$\Delta_{AOI}$' denotes an error of an AOI, and '$\Delta_{Sen-Al}$' denotes an error of an alignment state of a sensor. '$A_{Re}$' denotes the remaining error, which is a type of noise that is input to the sensor, and may be disregarded in a corresponding relation with the measurement spectrum Sm. The measurement spectrum Sm and an ideal spectrum Si may be represented by a row matrix, and $\Delta_{AOI}$ and $\Delta_{Sen-Al}$ may be represented by a square matrix. The second step Step 2 may correspond to operations S130 and S150 of FIG. 1.

The measurement spectrum Sm may be calibrated using quantified errors of the apparatus parameters acquired through the method described above. As a result, a calibrated spectrum may be determined. Since the calibrated spectrum is a spectrum to which an error due to error components of a measuring apparatus have been accounted for, the calibrated spectrum may correspond to an ideal spectrum, that is, a measurement spectrum generated by a normal measuring apparatus.

Thus, according to exemplary embodiments of the present inventive concept, errors of the apparatus parameters of a measuring apparatus may be quantified, and a calibrated spectrum may be determined based on the quantified errors using the process described above. Since the calibrated spectrum corresponds to a spectrum measured by a normal measuring apparatus free of errors, information about the thickness or shape of the measurement target may be acquired based on the calibrated spectrum.

FIGS. 13A to 13D are graphs showing a process of determining a calibrated spectrum by applying the calibration method of FIG. 1 to a plurality of measuring apparatuses.

Figure 13A:
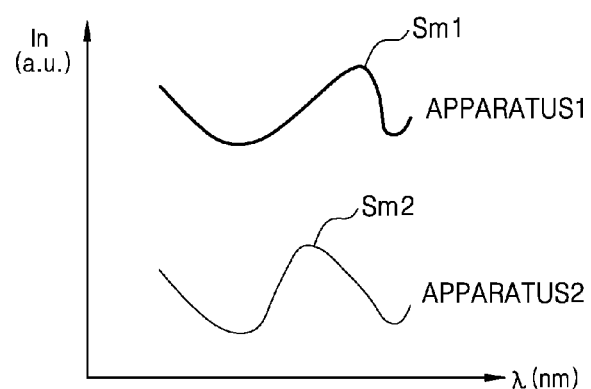

FIG. 13A shows measurement spectrums Sm1 and Sm2 generated by a first measuring apparatus APPARATUS1 and a second measuring apparatus APPARATUS2, respectively. FIG. 13B illustrates a process of comparing the measurement spectrums Sm1 and Sm2 to an ideal spectrum Si, and determining an approximate spectrum using spectrum modeling. A process of determining the approximate spectrum is the same as the process described with reference to FIGS. 12A to 12D. In FIG. 13B, for convenience of description, the measurement spectrums Sm1 and Sm2 are indicated by a representative symbol Sm.

Figure 13C:
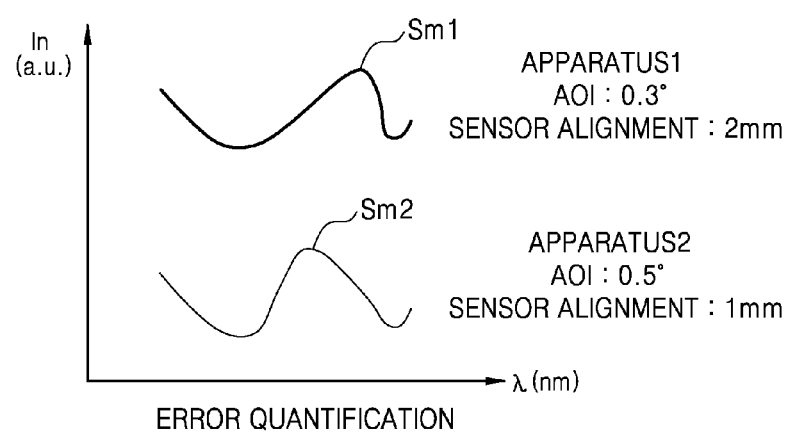

FIG. 13C corresponds to a process of quantifying errors of apparatus parameters based on the approximate spectrum after the approximate spectrum is determined. For example, in the first measuring apparatus APPARATUS1, an error of an AOI may be quantified as 0.3° and an error of a sensor alignment state may be quantified as 2 mm. In the second measuring apparatus APPARATUS2, an error of an AOI may be quantified as 0.5° and an error of a sensor alignment state may be quantified as 1 mm.

Figure 13D:
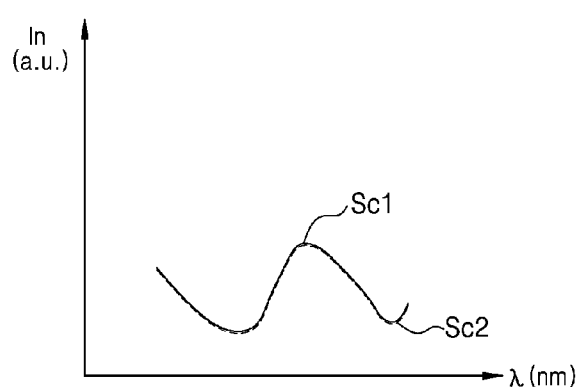

FIG. 13D shows calibrated spectrums Sc1 and Sc2 acquired based on the quantized errors of the apparatus parameters determined using the measurement spectrums Sm1 and Sm2. The quantized errors may be determined using, for example, an inverse operation. Since the quantized errors of the apparatus parameters are taken into account, the calibrated spectrums Sc1 and Sc2 may be close or equal to an ideal spectrum. Accordingly, the forms of the calibrated spectrums Sc1 and Sc2 of the first and second measuring apparatuses APPARATUS1 and APPARATUS2 may be substantially the same as each other, as shown in FIG. 13D.

A third step Step 3 for determining a calibrated spectrum Sc based on errors of apparatus parameters using an inverse operation is represented by the following equation:

$$Sc = Sm * (\Delta_{AOI})^{-1} * (\Delta_{Sen-Al})^{-1} \qquad \text{Step 3:}$$

As stated in the second step Step 2, the calibrated spectrum Sc may be substantially the same as the ideal spectrum Si since an effect of the remaining error $\Delta_{Re}$ is insignificant. In addition, when errors $\Delta_{AOI}$ and $\Delta_{Sen-Al}$ of the apparatus parameters are represented by a square matrix, the calibrated spectrum Sc may be determined by obtaining an inverse matrix $(\Delta_{AOI})^{-1}$ of the error $\Delta_{AOI}$ and an inverse matrix $(\Delta_{Sen-Al})^{-1}$ of the error $\Delta_{Sen-Al}$, and multiplying the inverse matrix $(\Delta_{AOI})^{-1}$ and the inverse matrix $(\Delta_{Sen-Al})^{-1}$ by the measurement spectrum Sm that is represented as a form of a row matrix.

Figure 14:
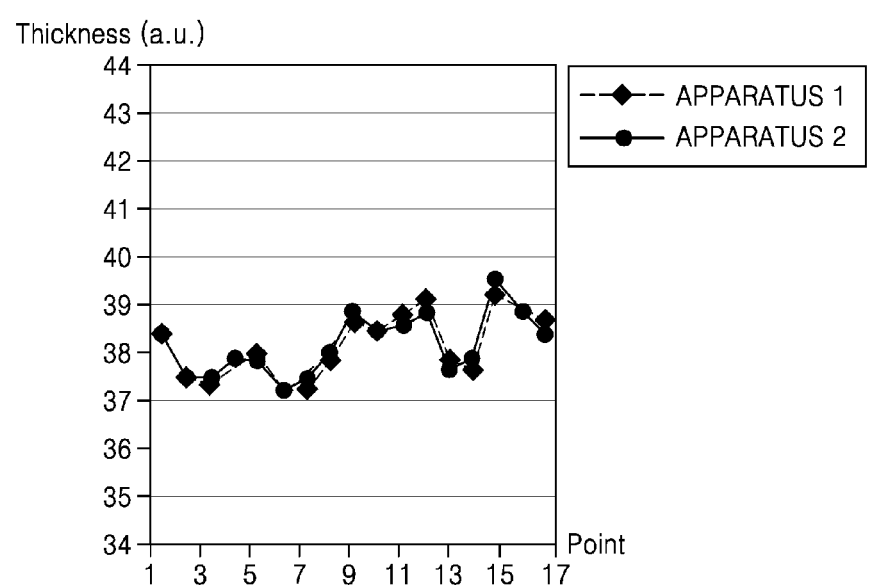
FIG. 14 is a graph showing thicknesses of a measurement target acquired using measuring apparatuses in which calibration has been performed through the process described with reference to FIGS. 13A to 13D.

FIG. 14 is a graph showing thicknesses of a measurement target acquired using measuring apparatuses in which calibration has been performed through the process described with reference to FIGS. 13A to 13D. The x-axis of the graph indicates points at which measurement has been performed, and the y-axis of the graph indicates thickness having an arbitrary unit (a.u.).

Referring to FIG. 14, thicknesses of the measurement target, which are acquired using a first measuring apparatus APPARATUS1 and a second measuring apparatus APPARATUS2, are nearly equal to each other at all points. A process of measuring the thickness of the measurement target is briefly described again herein. Calibration may be performed on the first measuring apparatus APPARATUS1 and the second measuring apparatus APPARATUS2 through the process of FIGS. 13A to 13D. For example, errors of apparatus parameters for the first and second measuring apparatuses APPARATUS1 and APPARATUS2 may be calculated. For example, it is assumed that an error of an apparatus parameter of the first measuring apparatus APPARATUS1 is $\Delta_1$ and an error of an apparatus parameter of the second measuring apparatus APPARATUS2 is $\Delta_2$. Since $\Delta_1$ represents an error state of elements of the first measuring apparatus APPARATUS1 and $\Delta_2$ represents an error state of elements of the second measuring apparatus APPARATUS2, $\Delta_1$ and $\Delta_2$ may be different from each other.

After the errors $\Delta_1$ and $\Delta_2$ of the apparatus parameters of the first and second measuring apparatuses APPARATUS1 and APPARATUS2 are calculated, a first measurement spectrum Srm1 is acquired with respect to the measurement target using the first measuring apparatus APPARATUS1, and a second measurement spectrum Srm2 is acquired with respect to the measurement target using the second measuring apparatus APPARATUS2. Next, the errors $\Delta_1$ and $\Delta_2$ of the apparatus parameters are taken into account with reference to the first and second measurement spectrums Srm1 and Srm2 (e.g., through an inverse operation). As a result, first and second calibrated spectrums Src1 and Src2 for the measurement target may be determined. As described with reference to FIGS. 13A to 13D, the form of the first calibrated spectrum Src1 may be substantially the same as that of the second calibrated spectrum Src2. However, the calibrated spectrums Sc1 and Sc2 described with reference to FIGS. 13A to 13D are different from the calibrated spectrums Src1 and Scr2 in that the calibrated spectrums Sc1 and Sc2 are for a sample, and the calibrated spectrums Src1 and Scr2 are for an actual measurement target. In addition, since physical characteristics of the sample are different from those of the actual measurement target, the measurement spectrums Sm1 and Sm2 for the sample may be different from the measurement spectrums Srm1 and Srm2 for the measurement target, and the calibrated spectrums Sc1 and Sc2 of the sample may be different from the calibrated spectrums Src1 and Src2 of the measurement target.

Next, approximate spectrums Srap1 and Srap2 that approximate the calibrated spectrums Src1 and Src2 are determined through spectrum modeling while changing values of parameters of a sample. When the approximate spectrums Srap1 and Srap2 are determined, thicknesses of the measurement target may be acquired based on values of parameters used in the approximate spectrums Srap1 and Srap2. Since the first calibrated spectrum Src1 and the second calibrated spectrum Src1 have substantially the same form, the approximate spectrums Srap1 and Srap2 corresponding thereto may also have substantially the same form. Thus, the thicknesses of the measurement target may be substantially equal to each other.

As a result, when a measurement target is measured based on the calibration method according to the present exemplary embodiment, substantially the same data may be acquired with respect to the measurement target regardless of an error component of a measuring apparatus corresponding to the measurement target. For example, since error components of measuring apparatuses are calibrated by the calibration method described above, the measuring apparatuses may acquire the same data with respect to the measurement target. In addition, the same data acquired by the measuring apparatuses may correspond to an actual value for the measurement target. When the calibration method according to the present exemplary embodiment is performed on a measuring apparatus, an error component correction process is not performed. For example, when errors of apparatus parameters are acquired based on a sample measurement, the errors of the apparatus parameters may be continuously used to determine a calibrated spectrum with respect to another measurement target or a measurement target in another process step when the same measuring apparatus is used.

Figure 15A:
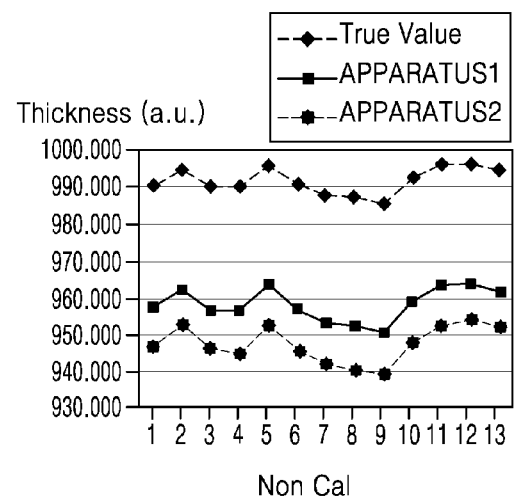
FIGS. 15A to 15C are graphs showing thicknesses of a measurement target acquired using two measuring apparatuses.
Figure 15B:
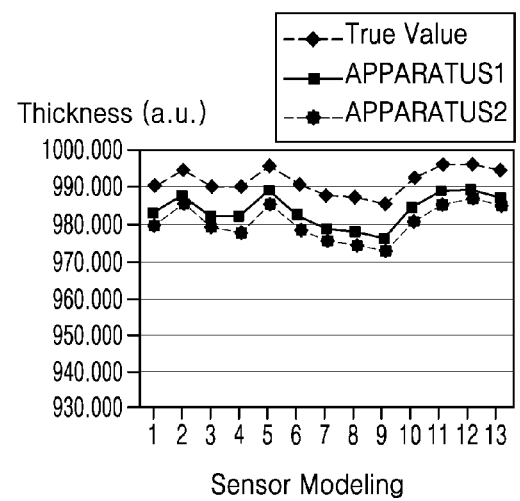
Figure 15C:
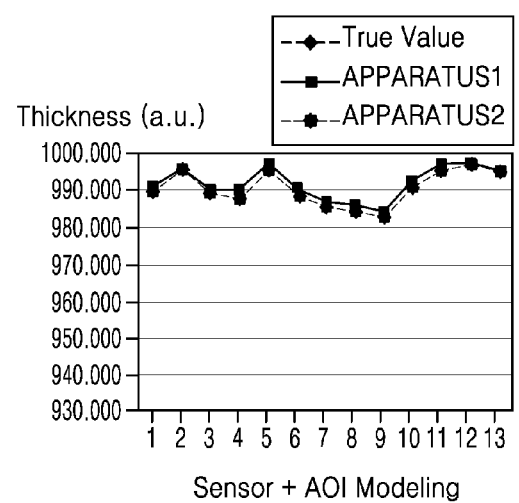

FIGS. 15A to 15C are graphs showing thicknesses of a measurement target acquired using two measuring apparatuses. The x-axes of the graphs indicate points at which measurement has been performed, and the y-axes of the graphs indicate a thickness having an arbitrary unit (a.u.).

FIG. 15A is a graph showing thicknesses of a measurement target acquired using a first measuring apparatus APPARATUS1 and a second measuring apparatus APPARATUS2 in a state in which the calibration method according to the present exemplary embodiment has not been applied to the first and second measuring apparatuses APPARATUS1 and APPARATUS2. Here, "True Value" indicates a thickness of the measurement target acquired using a measuring apparatus in which states of all elements are normal, and may be substantially the same as an actual thickness of the measurement target. As shown in FIG. 15A, the thicknesses of the measurement target acquired using the first measuring apparatus APPARATUS1 and the second measuring apparatus APPARATUS2 are substantially different from "True Value". In addition, there is a difference between the thickness acquired using the first measuring apparatus APPARATUS1 and the thickness acquired using the second measuring apparatus APPARATUS2.

FIG. 15B is a graph showing thicknesses of a measurement target acquired using the first measuring apparatus APPARATUS1 and the second measuring apparatus APPARATUS2 in a state in which the calibration method according to the present exemplary embodiment has been applied to the first and second measuring apparatuses APPARATUS1 and APPARATUS2, in which only a sensor alignment state has been determined to be an apparatus parameter. As shown in FIG. 15B, the thicknesses of the measurement target acquired using the first measuring apparatus APPARATUS1 and the second measuring apparatus APPARATUS2 are different from "True Value". In addition, there is a slight difference between the thickness acquired using the first measuring apparatus APPARATUS1 and the thickness acquired using the second measuring apparatus APPARATUS2.

FIG. 15C is a graph showing thicknesses of a measurement target acquired using the first measuring apparatus APPARATUS1 and the second measuring apparatus APPARATUS2 in a state in which the calibration method according to the present exemplary embodiment has been applied to the first and second measuring apparatuses APPARATUS1 and APPARATUS2, in which both a sensor alignment state and an AOI have been determined to be apparatus parameters. As shown in FIG. 15C, the thicknesses of the measurement target acquired using the first measuring apparatus APPARATUS1 and the second measuring apparatus APPARATUS2 are only slightly different from "True Value". In addition, there is little difference between the thickness acquired using the first measuring apparatus APPARATUS1 and the thickness acquired using the second measuring apparatus APPARATUS2.

Through the results of FIGS. 15A to 15C, it is shown that as a large number of apparatus parameters are taken into account during calibration, data of a measurement target acquired using a measuring apparatus corresponding to the apparatus parameters becomes increasingly accurate. In addition, it is shown that even if only several apparatus parameters having an influence on a spectrum are taken into account during calibration, rather than taking all apparatus parameters into account during calibration, data of the measurement target that is close to "True Value" may be acquired.

Figure 16:
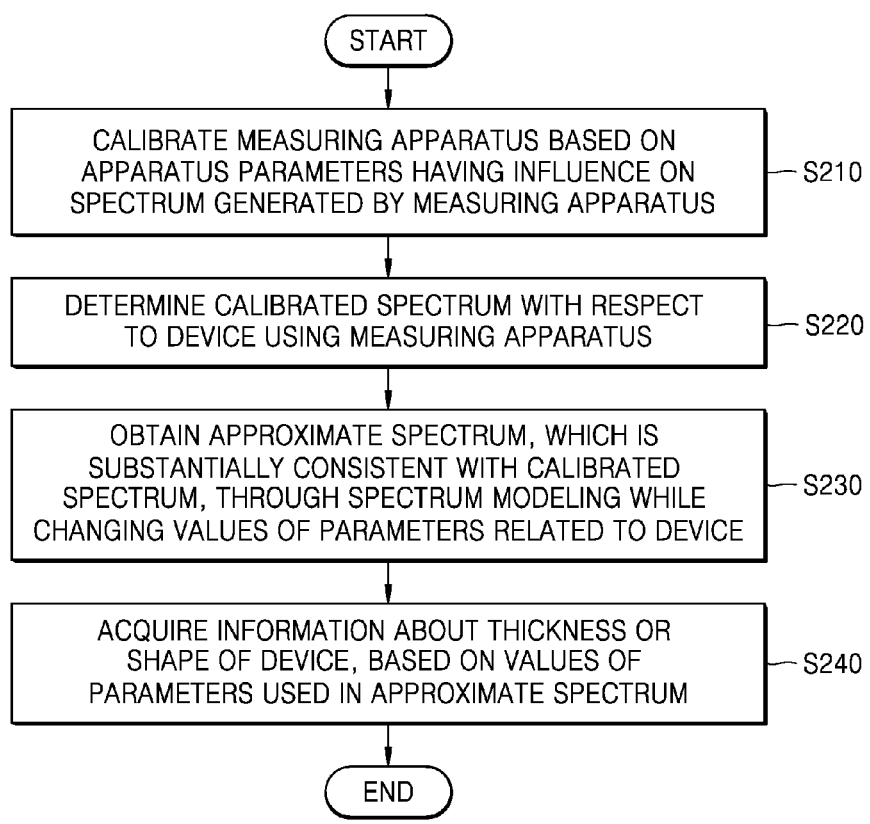
FIG. 16 is a flowchart of a method of measuring a characteristic of a device based on a calibration method according to an exemplary embodiment of the inventive concept.

FIG. 16 is a flowchart of a method of measuring a characteristic of a device based on a calibration method according to an exemplary embodiment of the inventive concept. For convenience of explanation, a further description of elements and processes previously described with reference to FIGS. 1 to 15C may be omitted or only briefly described herein.

Referring to FIG. 16, a measuring apparatus is calibrated based on apparatus parameters having an influence on a spectrum generated by the measuring apparatus at operation S210, as described above. The calibration of the measuring apparatus may be performed using the calibration method described with reference to FIG. 1. For example, in an exemplary embodiment, operation S210 of FIG. 2 may include performing operation S110, operation S130, operation S150, and operation S170 of FIG. 1. In an exemplary embodiment, operation S210 of FIG. 2 may include performing operation SI 10, S130, and S150 of FIG. 1 (e.g., operation S170 may not be performed). Operation S170 may be omitted in an exemplary embodiment because calibration using an error of apparatus parameters may not be performed on a measurement spectrum of a sample (as opposed to a measurement spectrum of an actual measurement target). In an exemplary embodiment, to determine whether calibration has been properly performed on each of a plurality of measuring apparatuses, the calibration may be performed on a measurement spectrum of a sample.

Next, a calibrated spectrum is determined with respect to a device (e.g., a measurement target) using the calibrated measuring apparatus at operation S220. For example, a calibrated spectrum may be determined by generating a measurement spectrum of a device using the measuring apparatus, and taking an error of apparatus parameters acquired before generating the measurement spectrum into account when determining the calibrated spectrum, as described above. Further, as described above, this process may be implemented using an inverse operation.

After the calibrated spectrum is determined, an approximate spectrum that is substantially consistent with the calibrated spectrum is determined using a spectrum modeling process in which values of parameters related to the device are changed at operation S230, as described above. The parameters related to the device may correspond to the sample parameters described above. As used herein, the term 'substantially consistent' is understood to mean that the approximate spectrum and the calibrated spectrum are identical to each other, indistinguishable from each other, or distinguishable from each other but functionally the same as each other as would be understood by a person having ordinary skill in the art. The approximate spectrum may be obtained by changing the values of the parameters related to the device during the spectrum modeling process until the approximate spectrum is substantially consistent with the calibrated spectrum.

When the approximate spectrum is obtained, information about characteristics (e.g., the thickness or shape) of the device is acquired based on the values of the parameters related to the device used to obtain the approximate spectrum at operation S240.

Figure 17:
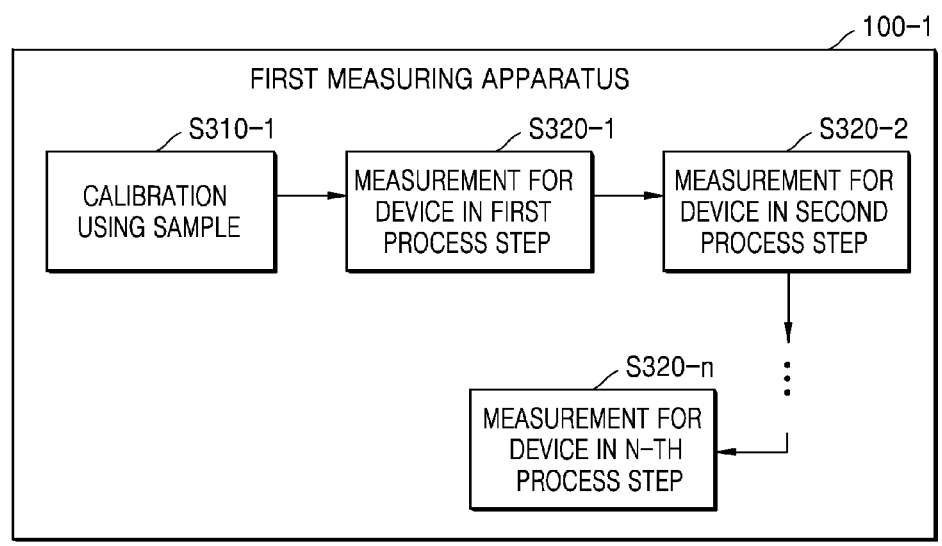
FIG. 17 is a block diagram showing a method of measuring a device in various process steps, which is performed by one measuring apparatus, according to an exemplary embodiment of the inventive concept.

FIG. 17 is a block diagram showing a method of measuring a device in various process steps, which is performed by one measuring apparatus, according to an exemplary embodiment of the inventive concept. A further description of elements and processes previously described with reference to FIGS. 1 to 15C may be omitted or only briefly described herein.

Referring to FIG. 17, a first measuring apparatus 100-1 is calibrated using a sample at operation S310-1. The sample may be, for example, a bare wafer. Calibration for the first measuring apparatus 100-1 may be performed using the calibration method described with reference to FIG. 1. Accordingly, the calibration for the first measuring apparatus 100-1 may include operation S110, operation S130, operation S150, and operation S170 of FIG. 1. As described above, an inverse operation may be utilized. In addition, as described above, in an exemplary embodiment, the calibration for the first measuring apparatus 100-1 may include operations S110 to S150, and not operation S170.

Next, measurement for a device in a first process step is performed at operation S320-1. For example, with respect to the device on which the first process step has been performed, a measurement spectrum is generated using the first measuring apparatus 100-1. A calibrated spectrum is determined by taking an error of apparatus parameters with relation to the generated measurement spectrum (e.g., using an inverse operation). Then, an approximate spectrum that is substantially consistent with the calibrated spectrum is determined using spectrum modeling while changing values of parameters related to the device. When the approximate spectrum is obtained, data about the thickness or shape of the device in the first process step is acquired based on values of the parameters used to obtain the approximate spectrum.

Next, measurement for the device in a second process step is performed at operation S320-2. The measurement for the device in the second process step may be performed through substantially the same process as the measurement for the device in the first process step.

Next, measurement for the device in an n-th process step is performed at operation S320-n. The measurement for the device in the n-th process step may also be performed through substantially the same process as the measurement for the device in the first process step. Here, n may be an integer that is equal to or greater than 3, and the n-th process step may correspond to a final process step that may be performed in the first measuring apparatus 100-1. When n is equal to or greater than 3, the same process as the measurement for the device in the first process step may also be performed, using the first measurement apparatus 100-1, on the device in any one of process steps between the second process step and the n-th process step. For example, when n is equal to 10, the same process as the measurement for the device in the first process step may also be performed, using the first measurement apparatus 100-1, on the device in third to ninth process steps as well as a tenth process step.

The measuring method according to the present exemplary embodiment is a method of measuring a device in various process steps using one measuring apparatus (e.g., the first measuring apparatus 100-1). As shown in FIG. 17, when calibration for the first measuring apparatus 100-1 is performed once, it is not necessary to perform calibration for the first measuring apparatus 100-1 in other process steps for the device. For example, an error of an apparatus parameter acquired using a sample in the first measuring apparatus 100-1 may be applied to measurement for a device in all process steps using the first measuring apparatus 100-1 as well as a first process step. Accordingly, it is not necessary to perform calibration for the first measuring apparatus 100-1 separately for each process.

Figure 18:
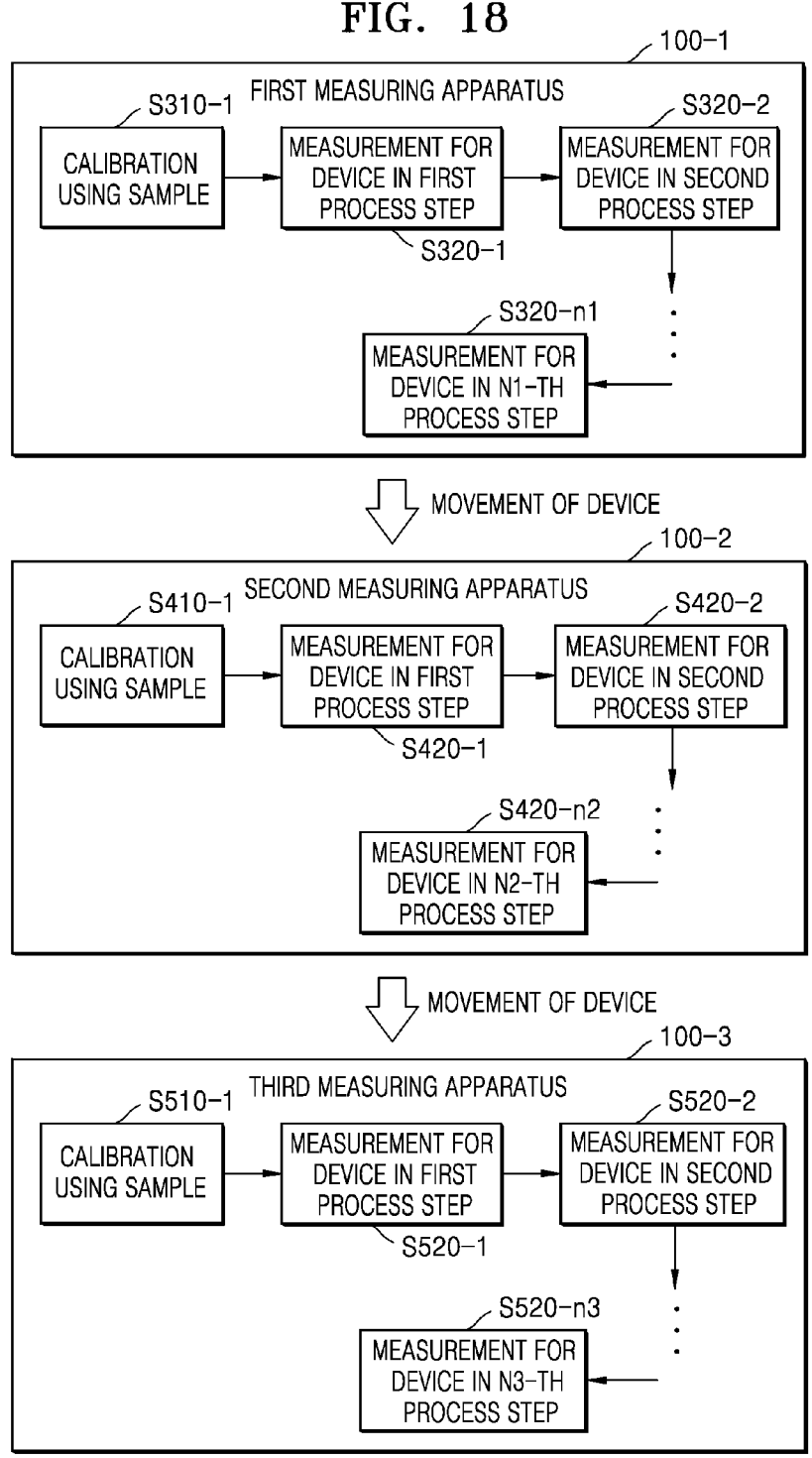
FIG. 18 is a block diagram showing a method of measuring a device in various process steps, which is performed by a plurality of measuring apparatuses, according to an exemplary embodiment of the inventive concept.

FIG. 18 is a block diagram showing a method of measuring a device in various process steps, which is performed by a plurality of measuring apparatuses, according to an exemplary embodiment of the inventive concept. A further description of elements and processes previously described with reference to FIGS. 1 to 17 may be omitted or briefly described herein.

Referring to FIG. 18, measurement for a device in a first process step to an n1-*th* process step is performed in a first measuring apparatus 100-1 at operations S310-1 to S320-n1. The measurement for the device in the first process step to the n1-*th* process step is the same as that described with respect to the first measuring apparatus 100-1 of FIG. 17. Here, n1 may be an integer that is equal to or greater than 3, and the n1-*th* process step may correspond to a final process step that may be performed in the first measuring apparatus 100-1.

Next, the device moves to a second measuring apparatus 100-2, and measurement for the device in a first process step to an n2-*th* process step is performed in the second measuring apparatus 100-2 at operations S410-1 to S420-n2. The measurement for the device in the first process step to the n2-*th* process step is performed in the same way as described with respect to the first measuring apparatus 100-1 of FIG. 17, except for being performed in the second measuring apparatus 100-2. Here, n2 may be an integer that is equal to or greater than 3, and the n2-*th* process step may correspond to a final process step that may be performed in the second measuring apparatus 100-2. When a measuring apparatus is switched to another measuring apparatus, calibration using a sample may first be performed on the other measuring apparatus. For example, to perform measurement for the device using the second measuring apparatus 100-2, calibration using a sample is first performed on the second measuring apparatus 100-2 at operation S410-1. The first process step and the second process step in the second measuring apparatus 100-2 may be different from the first process step and the second process step in the first measuring apparatus 100-1.

Next, the device moves to a third measuring apparatus 100-3, and measurement for the device in a first process step to an n3-*th* process step is performed in the third measuring apparatus 100-3 at operations S510-1 to S520-n3. The measurement for the device in the first process step to the n3-*th* process step is performed in the same way as described with respect to the first measuring apparatus 100-1 of FIG. 17, except for being performed in the third measuring apparatus 100-3. Here, n3 may be an integer that is equal to or greater than 3, and the n3-*th* process step may correspond to a final process step that may be performed in the third measuring apparatus 100-3. To perform measurement for the device using the third measuring apparatus 100-3, calibration using a sample is first performed on the third measuring apparatus 100-3 at operation S510-1. The first process step and the second process step in the third measuring apparatus 100-3 may be different from the first process step and the second process step in the first measuring apparatus 100-1 or the second measuring apparatus 100-1.

The measuring method according to the present exemplary embodiment is a method of measuring a device in various process steps using a plurality of measuring apparatuses, for example, the first to third measuring apparatuses 100-1 to 100-3. As shown in FIG. 18, when calibration for each of the first to third measuring apparatuses 100-1 to 100-3 is performed once, it is not necessary to perform calibration for the first to third measuring apparatuses 100-1 to 100-3 any more in other process steps for the device. For example, when an error of an apparatus parameter is acquired using a sample, in each of the first to third measuring apparatuses 100-1 to 100-3, the error of the apparatus parameter may be applied to measurement for a device in all process steps using each of the first to third measuring apparatuses 100-1 to 100-3. Accordingly, it is not necessary to perform calibration for each of the first to third measuring apparatuses 100-1 to 100-3 separately for each process.

Although three measuring apparatuses are used in the method of measuring a device according to the present exemplary embodiment, the number of measuring apparatuses is not limited to three. For example, the number of measuring apparatuses that are used in the method of measuring a device may be two, or may be four or more.

Figure 19:
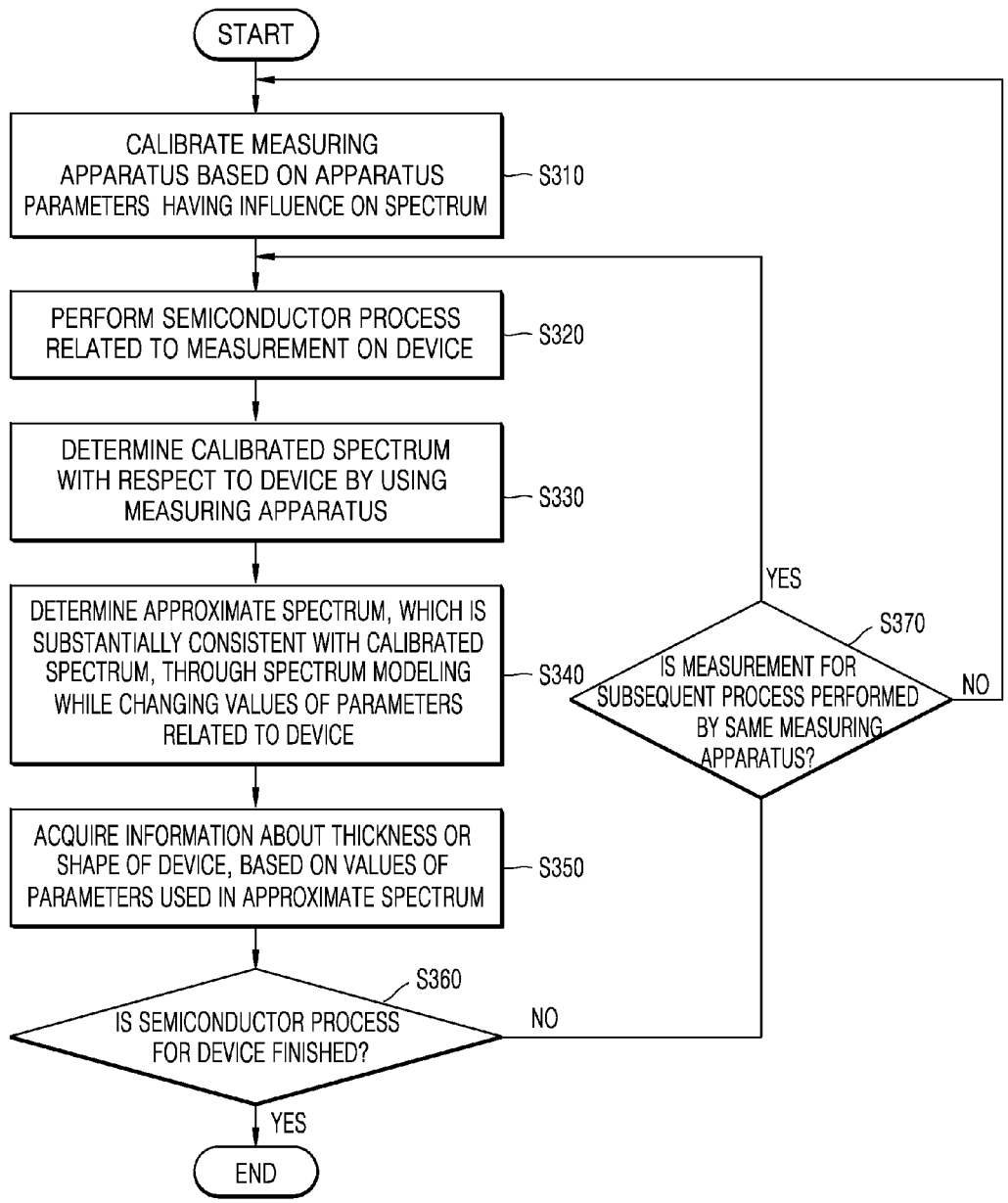
FIG. 19 is a flowchart of a method of manufacturing a device based on a calibration method according to an exemplary embodiment of the inventive concept.

FIG. 19 is a flowchart of a method of manufacturing a device based on a calibration method according to an exemplary embodiment of the inventive concept. A further description of elements and processes previously described with reference to FIGS. 1 to 18 may be omitted or briefly described herein.

Referring to FIG. 19, a measuring apparatus is calibrated based on apparatus parameters having an influence on the spectrum at operation S310. Calibration of the measuring apparatus may be performed using the calibration method described with reference to FIG. 1. Accordingly, the calibration of the measuring apparatus may include operation S110, operation S130, operation S150, and operation S170 of FIG. 1. In addition, as described above, in an exemplary embodiment, calibration of the measuring apparatus may include operations S110 to S150, and not operation S170.

Next, a semiconductor process related to measurement is performed on a device at operation S320. Here, the semiconductor process related to a measurement refers to a process in which measurement is performed after a process is performed. Examples of the semiconductor process related to a measurement include a deposition process, a photolithography process, an etch process, a cleaning process, etc.

After the semiconductor process is performed, a calibrated spectrum is determined with respect to the device using the measuring apparatus at operation S330. For example, a calibrated spectrum may be determined by generating a measurement spectrum of the device using the measuring apparatus, and accounting for an error of apparatus parameters acquired before generating the measurement spectrum (e.g., through an inverse operation).

After the calibrated spectrum is generated, an approximate spectrum that is substantially consistent with the calibrated spectrum is obtained through spectrum modeling while changing values of parameters related to the device at operation S340. The parameters related to the device may correspond to the sample parameters described above.

When the approximate spectrum is obtained, information about a characteristic of the device (e.g., the thickness or shape of the device) is acquired based on values of parameters used to obtain the approximate spectrum at operation S350.

After the information about the thickness or shape of the device is acquired, it is determined whether the semiconductor process for the device is finished at operation S360. If it is determined that the semiconductor process is finished (YES), the method of manufacturing the device based on a calibration method is ended.

If it is determined that the semiconductor process is not finished (NO), it is determined whether measurement for a subsequent process is performed by the same measuring apparatus at operation S370. If it is determined that the measurement for the subsequent process is performed by the same measuring apparatus (YES), the method proceeds to operation S320 of performing a semiconductor process related to a measurement on a device. If it is determined that the measurement for the subsequent process is not performed by the same measuring apparatus (NO) (e.g., the measurement for a subsequent process is performed in another measuring apparatus), the method proceeds to operation S310 of calibrating a measuring apparatus. Here, the measuring apparatus is not the previous measuring apparatus, but rather, another measuring apparatus that performs measurement for the device in the subsequent process. In this manner, when measurement for a device is performed through a measuring apparatus different from the previous measuring apparatus, a calibration step for the measuring apparatus different from the previous measuring apparatus may be performed before a spectrum is generated.

FIG. 20 is a flowchart of a method of manufacturing a device based on a calibration method according to an exemplary embodiment of the inventive concept. A further description of elements and processes previously described with reference to FIGS. 1 to 19 may be omitted or briefly described herein.

Referring to FIG. 20, operation S310 includes calibrating a measuring apparatus based on apparatus parameters having an influence on the spectrum generated by the measuring apparatus, operation S320 includes performing a semiconductor process related to a measurement on a device, operation S330 includes determining a calibrated spectrum, to which calibration has been reflected, with respect to the device using the measuring apparatus, operation S340 includes determining an approximate spectrum, which is substantially consistent with the calibrated spectrum, through spectrum modeling while changing values of parameters related to the device, and operation S350 includes acquiring information about the thickness or shape of the device based on values of parameters used in the approximate spectrum. These operations are sequentially performed in an exemplary embodiment. Operations S310, S320, S330, S340, and S350 may be the same as those described with reference to FIG. 16 or FIG. 19.

After the information about the thickness or shape of the device is acquired, it is determined whether the semiconductor process for the device is finished at operation S360. If it is determined that the semiconductor process is finished (YES), the method of manufacturing the device based on a calibration method is ended.

If it is determined that the semiconductor process is not finished (NO), it is determined whether a subsequent process is a process related to a measurement at operation S380. If it is determined that the subsequent process is not a process related to a measurement (NO), a semiconductor process, which is not related to a measurement, is performed at operation S390. After the semiconductor process which is not related to a measurement is performed, the method proceeds to operation S360 of determining whether the semiconductor process for the device is finished.

If it is determined that the subsequent process is a process related to a measurement (YES), it is determined whether measurement for the subsequent process is performed by the same measuring apparatus at operation S370. If it is determined that the measurement for the subsequent process is performed by the same measuring apparatus (YES), operation S320 of performing a semiconductor process related to a measurement on a device is executed again. If it is determined that the measurement for the subsequent process is not performed by the same measuring apparatus (NO), operation S310 of calibrating a measuring apparatus is executed again. Here, the measuring apparatus is not the previous measuring apparatus, but rather, is another measuring apparatus that performs measurement for the device in the subsequent process. In this manner, when measurement for a device is performed through a measuring apparatus different from the previous measuring apparatus, a calibration step for the measuring apparatus different from the previous measuring apparatus may be performed before a measurement spectrum is acquired.

While the inventive concept has been particularly shown and described with reference to the exemplary embodiments thereof, it will be understood that various changes in form and detail may be made therein without departing from the spirit and scope of the present inventive concept as defined by the following claims.

What is claimed is:

1. A method of calibrating a measuring apparatus that performs measurements using a spectrum of light, comprising:
    determining apparatus parameters that have an influence on a measurement spectrum generated by the measuring apparatus;
    generating the measurement spectrum by exposing a measurement target on a sample to light generated by the measuring apparatus;
    calculating an error of the apparatus parameters by comparing the measurement spectrum to an ideal spectrum corresponding to the apparatus parameters; and
    calibrating the measuring apparatus based on the calculated error of the apparatus parameters,
    wherein the apparatus parameters comprise an angle of incidence (AOI), and an alignment state of a sensor of the measuring apparatus that detects light reflected from the sample,
    wherein the AOI is an angle of light that is incident onto the sample.

2. The method of claim 1, wherein the measuring apparatus is calibrated based on the calculated error of the apparatus parameters using an inverse operation.

3. The method of claim 1, wherein the ideal spectrum is determined by spectrum modeling based on the sample.

4. The method of claim 1, wherein calculating the error of the apparatus parameters comprises quantifying the error of the apparatus parameters.

5. The method of claim 4, wherein quantifying the error of the apparatus parameters comprises:
    determining an approximate spectrum by changing values of the apparatus parameters during a spectrum modeling process until the measurement spectrum matches the ideal spectrum; and
    subtracting a reference value of the apparatus parameters corresponding to the ideal spectrum from the values of the apparatus parameters used to obtain the approximate spectrum.

6. The method of claim 4, wherein the error of the apparatus parameters is quantified to values of a matrix,
    wherein the measuring apparatus is calibrated by calculating an inverse matrix of the matrix, and generating an equation representing the measurement spectrum using the inverse matrix.

7. The method of claim 1, wherein the measuring apparatus is a spectroscopic ellipsometry (SE) apparatus.

8. The method of claim 7, wherein the alignment state of the sensor comprises a position state of an array detector in the sensor, a rotation state of the array detector, and a twisted state of the array detector.

9. The method of claim 1, further comprising:
    determining a calibrated spectrum based on the error of the apparatus parameters, wherein the calibrated spectrum is used to measure the measurement target.

10. The method of claim 9, wherein the measuring apparatus determines the calibrated spectrum with respect to another measurement target or the measurement target in another process step,
    wherein additional error calculation of the apparatus parameters or additional calibration is not performed on the measuring apparatus with respect to the other measurement target or the measurement target in the other process step.

11. A method of measuring a characteristic of a device, comprising:
    calibrating a measuring apparatus based on apparatus parameters that have an influence on a first measurement spectrum generated by the measuring apparatus,
    wherein the first measurement spectrum is generated by exposing a measurement target on the device to light generated by the measuring apparatus;
    determining a calibrated spectrum with respect to the device using the calibrated measuring apparatus;
    determining a first approximate spectrum by changing values of parameters related to the device during a spectrum modeling process, wherein the first approximate spectrum is substantially consistent with the calibrated spectrum; and
    acquiring information about the characteristic of the device based on the values of the parameters related to the device used to obtain the first approximate spectrum.

12. The method of claim 11, wherein the characteristic of the device comprises at least one of a thickness of the device and a shape of the device.

13. The method of claim 11, wherein calibrating the measuring apparatus comprises:
    determining the apparatus parameters;
    generating a second measurement spectrum by exposing a sample to light generated by the measuring apparatus; and
    calculating an error of the apparatus parameters by comparing the second measurement spectrum to an ideal spectrum corresponding to the apparatus parameters,
    wherein calibrating the measuring apparatus is based on the calculated error of the apparatus parameters.

14. The method of claim 13, wherein the ideal spectrum is determined by spectrum modeling based on the sample, wherein calculating the error of the apparatus parameters comprises quantifying the error of the apparatus parameters.

15. The method of claim 14, wherein quantifying the error of the apparatus parameters comprises:
- determining a second approximate spectrum by changing values of the apparatus parameters during a spectrum modeling process until the second measurement spectrum matches the ideal spectrum; and
- subtracting a reference value of the apparatus parameters corresponding to the ideal spectrum from the values of the apparatus parameters used to obtain the second approximate spectrum.

16. A method of manufacturing a device, comprising:
- calibrating a measuring apparatus based on apparatus parameters that have an influence on a first measurement spectrum generated by the measuring apparatus, wherein the first measurement spectrum is generated by exposing a measurement target on the device to light generated by the measuring apparatus;
- performing a semiconductor process related to a measurement on the device;
- determining a calibrated spectrum with respect to the device using the calibrated measuring apparatus;
- determining a first approximate spectrum by changing values of parameters related to the device during a spectrum modeling process, wherein the first approximate spectrum is substantially consistent with the calibrated spectrum; and
- acquiring information about a characteristic of the device based on the values of the parameters related to the device used to obtain the first approximate spectrum.

17. The method of claim 16, wherein calibrating the measuring apparatus comprises:
- determining the apparatus parameters;
- generating a second measurement spectrum by exposing a sample to light generated by the measuring apparatus; and
- calculating an error of the apparatus parameters by comparing the second measurement spectrum to an ideal spectrum corresponding to the apparatus parameters, wherein calibrating the measuring apparatus is based on the calculated error of the apparatus parameters.

18. The method of claim 16, further comprising:
- determining whether the semiconductor process is finished after acquiring the information; and
- determining whether a subsequent measurement is processed by the measuring apparatus.

19. The method of claim 18, wherein upon determining that the semiconductor process is not finished, the method further comprises:
- determining whether the subsequent measurement is performed by the measuring apparatus;
- performing the semiconductor process upon determining that the subsequent measurement is performed by the measuring apparatus; and
- calibrating the measuring apparatus upon determining that the subsequent measurement is not performed by the measuring apparatus.

20. The method of claim 16, further comprising:
- determining whether the semiconductor process for the device is finished after acquiring the information;
- determining whether a subsequent semiconductor process is related to a subsequent measurement;
- performing the subsequent semiconductor process upon determining that the subsequent semiconductor process is not related to the subsequent measurement; and
- determining whether the subsequent measurement is processed by the measuring apparatus upon determining that the subsequent semiconductor process is related to the subsequent measurement.

* * * * *